United States Patent
Kinoshita

(10) Patent No.: US 7,639,284 B2
(45) Date of Patent: Dec. 29, 2009

(54) METHOD FOR DETERMINING PHOTOGRAPHIC ENVIRONMENT AND IMAGING APPARATUS

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 10/935,031

(22) Filed: Sep. 7, 2004

(65) Prior Publication Data
US 2005/0093996 A1 May 5, 2005

(30) Foreign Application Priority Data
Sep. 8, 2003 (JP) ............................. 2003-315465

(51) Int. Cl.
*H04N 9/73* (2006.01)
(52) U.S. Cl. .................................................. 348/226.1
(58) Field of Classification Search ............. 348/226.1, 348/296, 362, 364, 365, 366, 367, 135
See application file for complete search history.

(56) References Cited

U.S. PATENT DOCUMENTS

| | | | |
|---|---|---|---|
| 6,501,518 B2 * | 12/2002 | Smith et al. | 348/425.3 |
| 6,573,933 B1 * | 6/2003 | Takayama | 348/226.1 |
| 6,710,818 B1 * | 3/2004 | Kasahara et al. | 348/607 |
| 6,721,006 B1 * | 4/2004 | Hata | 348/294 |
| 7,034,870 B2 * | 4/2006 | Nagaoka et al. | 348/228.1 |
| 7,164,439 B2 * | 1/2007 | Yoshida et al. | 348/226.1 |
| 2002/0158971 A1 * | 10/2002 | Daiku et al. | 348/226.1 |

FOREIGN PATENT DOCUMENTS

| | | |
|---|---|---|
| JP | 2001 111887 | 4/2001 |
| JP | 2001 119708 | 4/2001 |
| JP | 2002 84466 | 3/2002 |
| JP | 2002 521974 | 7/2002 |
| WO | WO 00 07363 | 2/2000 |

\* cited by examiner

*Primary Examiner*—Sinh Tran
*Assistant Examiner*—Albert H Cutler
(74) *Attorney, Agent, or Firm*—Frommer Lawrence & Haug LLP; William S. Frommer; Thomas F. Presson

(57) ABSTRACT

An NTSC imaging apparatus, in which the shutter speed is set to a first value other than N/120 second, and a flicker detecting process is performed on a video signal obtained at the first shutter speed to extract a particular frequency component. When the level of this frequency component is higher than a threshold value, photographing is conducted under fluorescent light with a power supply frequency of 50 Hz. When the level is not higher than the threshold value, the shutter speed is set to a second value other than N/100 second, and a flicker detecting process is performed on a video signal obtained at the second shutter speed to extract a particular frequency component. When the level of this frequency component is higher than a threshold value, photographing is conducted under fluorescent light with a power supply frequency of 60 Hz.

28 Claims, 17 Drawing Sheets

POWER SUPPLY FREQUENCY = 50Hz

FLUCTUATION OF FLUORESCENT-LIGHT BRIGHTNESS

POWER SUPPLY FREQUENCY = 60Hz

FLUCTUATION OF FLUORESCENT-LIGHT BRIGHTNESS

FIG. 7 (PRIOR ART)

| VERTICAL SYNC FREQUENCY (fv) | POWER SUPPLY FREQUENCY (fp) | FLICKER AT NORMAL SHUTTER SPEED | FLICKER AT HIGH SHUTTER SPEED | SHUTTER SPEED WITHOUT FLICKER |
|---|---|---|---|---|
| 60Hz (NTSC: 60 FIELDS/SEC) | 50Hz | FLICKER WITH THREE-FIELD INTERVALS | FLICKER WITH THREE-FIELD INTERVALS | 1/100 SEC |
| | 60Hz | FLICKER DOES NOT OCCUR | ONE-FIELD FLICKER | 1/120 SEC, 1/60 SEC |
| 50Hz (PAL: 50 FIELDS/SEC) | 50Hz | FLICKER DOES NOT OCCUR | ONE-FIELD FLICKER | 1/100 SEC, 1/50 SEC |
| | 60Hz | FLICKER WITH FIVE-FIELD INTERVALS | FLICKER WITH FIVE-FIELD INTERVALS | 1/120 SEC, 1/60 SEC |
| 30Hz (PROGRESSIVE: 30 FRAMES/SEC) | 50Hz | FLICKER WITH THREE-FRAME INTERVALS | FLICKER WITH THREE-FRAME INTERVALS | 1/100 SEC, 1/50 SEC, 3/100 SEC |
| | 60Hz | FLICKER DOES NOT OCCUR | ONE-FIELD FLICKER | 1/120 SEC, 1/60 SEC, 1/40 SEC, 1/30 SEC |

METHOD FOR DETERMINING PHOTOGRAPHIC ENVIRONMENT AND IMAGING APPARATUS

BACKGROUND OF THE INVENTION

1. Field of the Invention

The present invention relates to a method for determining a photographic environment when an object is photographed by an imaging apparatus including an XY-address-scanning imaging device such as a complementary metal oxide semiconductor (CMOS) imaging device. The present invention further relates to an imaging apparatus that determines a photographic environment.

2. Description of the Related Art

When an object is photographed by an imaging apparatus such as a digital video camera or a digital still camera, when particularly motion pictures are taken, it is important whether or not photographing is conducted under fluorescent light. Fluorescent lamps cause flickering, and therefore, measures against fluorescent flickering need be taken.

When an object is photographed by an imaging apparatus under fluorescent lamps that are powered directly by a household AC power supply, a temporal fluctuation of brightness perception, called fluorescent flicker, occurs in the video signal from a photographic output. Fluorescent flicker is caused by the difference between the frequency at which the brightness of fluorescent light changes (or the amount of light changes), which is twice as high as the frequency of the AC power supply, and the vertical sync frequency (or imaging frequency) of the imaging apparatus.

FIG. 1 shows fluorescent flicker when an object is photographed by an NTSC-compatible CCD (Charge Coupled Device) imaging apparatus under non-inverted fluorescent light in a region where the frequency of the power supply is 50 Hz. As shown in FIG. 1, one field is $1/60$ second (that is, the vertical sync frequency is 60 Hz), and the period over which the brightness of fluorescent light fluctuates is $1/100$ second. Thus, the timing of exposure for each field is deviated relative to the fluctuation of fluorescent-light brightness, and the amount of light exposed on each pixel varies from one field to another (or across fields).

At an exposure time of $1/60$ second, the amount of exposure is different in a period a1, a2, or a3 with the same exposure time. At an exposure time shorter than $1/60$ second (not equal to $1/100$ second, as described below), the amount of exposure is different in a period b1, b2, or b3 with the same exposure time.

The exposure timing is in synchronization with the fluctuation in fluorescent-light brightness every three fields (or $1/20$ second). That is, the flicker causes the brightness levels of light to alternately change every three fields. Although the luminance ratios (i.e., perception of flicker) of fields differ depending upon the exposure duration, the flicker intervals are not changed.

A fluorescent lamp radiates white light, and generally includes a plurality of phosphors, e.g., red, green, and blue phosphors each having unique afterglow characteristics. For a period of time from the end of discharge to the beginning of next discharge, which lies in the brightness fluctuation period, each phosphor attenuates illumination according to its afterglow characteristics. Initially, white light is radiated, and the light is attenuated while its hue gradually varies. At this time, if the exposure timing is deviated relative to the fluctuation of the fluorescent-light brightness, not only does the brightness change but also the hue. Moreover, due to the spectral characteristics of fluorescent light, namely, a strong peak is exhibited at a particular wavelength, the fluctuation component of the signal differs depending upon the color.

Such a change in hue and difference in fluctuation component between colors cause so-called color flicker.

If the exposure time is set to an integer multiple of the fluctuation period of the fluorescent-light brightness, i.e., $1/100$ second, but not in excess of one field (i.e., $1/60$ second), e.g., as shown in the lowermost portion of FIG. 1, if the exposure time is set to $1/100$ second, the amount of exposure is constant regardless of the exposure timing. Thus, flicker does not occur. In photographing an object under fluorescent light, instead of setting the shutter speed so that flicker does not occur, it is also conceivable to reduce the amount of flicker caused in the video signal from an imaging output.

In XY-address-scanning imaging apparatuses such as CMOS imaging apparatuses, on the other hand, the pixel exposure timing differs by one period of read clock (pixel clock) in the horizontal and vertical screen directions, and the exposure timing is therefore different on all pixels. Such an XY-address-scanning imaging apparatus causes fluorescent flicker in a different fashion from a CCD imaging apparatus.

Digital video cameras have an NTSC format and a PAL format. Recent digital video cameras are mostly compatible with both NTSC and PAL formats. Such digital video cameras are electrically set to either the NTSC or PAL format depending upon the destination when they are shipped from the factory. Digital still cameras have a progressive format with a frame frequency of 30 Hz.

The frequency of household AC power supply (i.e., fluorescent-lamp driving power supply) is 50 Hz or 60 Hz depending upon the region in Japan or the region or country in the world.

Fluorescent flicker will now be described when photographing is conducted by an NTSC or PAL CMOS imaging apparatus, or a progressive CMOS imaging apparatus having a frame frequency of 30 Hz in a region where the frequency of the power supply is 50 Hz or 60 Hz.

FIG. 2 shows fluorescent flicker when an object is photographed by an NTSC CMOS imaging apparatus under fluorescent light in a region where the frequency of the power supply is 50 Hz.

As described above, in a CMOS imaging apparatus, the exposure timing on pixels is also different in the horizontal screen direction. However, one horizontal period is much shorter than the period over which the brightness of fluorescent light fluctuates, and, actually, it can be presumed that the pixels on the same line are exposed to light at the same timing. The exposure timing for each line in the vertical screen direction is shown in FIG. 2.

As shown in FIG. 2, in the CMOS imaging apparatus, the exposure timing is different from one line to another, as indicated by F0, which indicates a different exposure timing in a particular field. The amount of exposure is also different depending upon the line. Thus, fluctuation in brightness and color is caused by flicker not only across fields but also within a field, and a fringe pattern appears on the screen. On the screen, the fringes themselves lie in the horizontal direction, and the fringes change in the vertical direction.

FIG. 3 is an illustration of screen flicker in a case where an object is formed of uniform patterns. One period (one wavelength) of the fringe pattern is $1/100$ second, and 1.666 periods of the fringe pattern are shown on the screen. Let the number of lines read per field be M. One period of the fringe pattern corresponds to L lines read, which is given by $L=M*60/100$. Throughout this document and the drawings, the asterisk (*) represents multiplication.

As shown in FIG. 4, five periods (or five wavelengths) of fringe pattern are shown in three fields (or three screens). The fringe pattern looks as if it were vertically advancing when viewed continuously.

Although FIGS. 3 and 4 show only fluctuation in brightness caused by flicker, actually, changes in color also occur, as described above, and the image quality is considerably degraded. In particular, color flicker is noticeable at a high shutter speed (or at a short exposure time). In the CMOS imaging apparatus, color flicker affects the screen, and degradation in image quality becomes more noticeable.

When an object is photographed by an NTSC CMOS imaging apparatus under fluorescent light in a region where the frequency of the power supply is 50 Hz, as shown in FIG. 5A, one field is $1/60$ second, and the period over which the brightness of fluorescent light fluctuates is $1/100$ second. At either a normal shutter speed where the exposure time is $1/60$ second or a high shutter speed where the exposure time is shorter than $1/60$ second, as shown in FIG. 5C, continuous flicker on the time axis with intervals of three fields (or three screens) occurs (as if it were vertically advancing when viewed continuously).

If the exposure time is set to an integer multiple of the fluctuation period of the fluorescent-light brightness, i.e., $1/100$ second, but not in excess of one field (i.e., $1/60$ second), that is, if the exposure time is set to $1/100$ second, the amount of exposure is constant regardless of the exposure timing. Thus, flicker, including screen flicker, does not occur.

Flicker for the NTSC CMOS imaging apparatus with a vertical sync frequency of 60 Hz and a power supply frequency of 50 Hz, described above, is shown FIG. 7.

When an object is photographed by an NTSC CMOS imaging apparatus under fluorescent light in a region where the frequency of the power supply is 60 Hz, as shown in FIG. 5B, one field is $1/60$ second, and the period over which the brightness of fluorescent light fluctuates is $1/120$ second. At a normal shutter speed where the exposure time is $1/60$ second, the amount of exposure is constant regardless of the exposure timing, and flicker, including screen flicker, does not occur. At a high shutter speed where the exposure time is shorter than $1/60$ second, however, as shown in FIG. 5D, one-field (one-screen) flicker in which flicker in each field (screen) has the same fringe pattern occurs.

If one-screen flicker in which flicker in each screen has the same fringe pattern occurs, a picture (background) component and a flicker component are not distinguished in a video signal sent from the imaging device.

Even at a high shutter speed, if the exposure time is set to the fluctuation period of the fluorescent-light brightness, i.e., $1/120$ second, like at a normal shutter speed where the exposure time is $1/60$ second, the amount of exposure is constant regardless of the exposure timing. Thus, flicker, including screen flicker, does not occur.

Flicker for the NTSC CMOS imaging apparatus with a vertical sync frequency of 60 Hz and a power supply frequency of 60 Hz, described above, is shown in FIG. 7.

When an object is photographed by a PAL CMOS imaging apparatus under fluorescent light in a region where the frequency of the power supply is 60 Hz, as shown in FIG. 6A, one field is $1/50$ second, and the period over which the brightness of fluorescent light fluctuates is $1/120$ second. At either a normal shutter speed where the exposure time is $1/50$ second or a high shutter speed where the exposure time is shorter than $1/50$ second, as shown in FIG. 6C, continuous flicker on the time axis with intervals of five fields (or five screens) occurs (as if it were vertically advancing when viewed continuously).

If the exposure time is set to an integer multiple of the fluctuation period of the fluorescent-light brightness, i.e., $1/120$ second, but not in excess of one field (i.e., $1/50$ second), that is, if the exposure time is set to $1/120$ second or $1/60$ second, the amount of exposure is constant regardless of the exposure timing. Thus, flicker, including screen flicker, does not occur.

Flicker for the PAL CMOS imaging apparatus with a vertical sync frequency of 50 Hz and a power supply frequency of 60 Hz, described above, is shown in FIG. 7.

When an object is photographed by a PAL CMOS imaging apparatus under fluorescent light in a region where the frequency of the power supply is 50 Hz, as shown in FIG. 6B, one field is $1/50$ second, and the period over which the brightness of fluorescent light fluctuates is $1/100$ second. At a normal shutter speed where the exposure time is $1/50$ second, the amount of exposure is constant regardless of the timing exposure, and flicker, including screen flicker, does not occur. At a high shutter speed where the exposure time is shorter than $1/50$ second, however, as shown in FIG. 6D, one-field (one-screen) flicker in which flicker in each field (each screen) has the same fringe pattern occurs.

Even at a high shutter speed, if the exposure time is set to the fluctuation period of the fluorescent-light brightness, i.e., $1/100$ second, like at a normal shutter speed where the exposure time is $1/50$ second, the amount of exposure is constant regardless of the exposure timing. Thus, flicker, including screen flicker, does not occur.

Flicker for the PAL CMOS imaging apparatus with a vertical sync frequency of 50 Hz and a power supply frequency of 50 Hz, described above, is shown in FIG. 7.

When an object is photographed by a progressive CMOS imaging apparatus having a frame frequency of 30 Hz under fluorescent light in a region where the frequency of the power supply is 50 Hz, although not shown, one frame is $1/30$ second (or the vertical sync frequency is 30 Hz), and the period over which the brightness of fluorescent light fluctuates is $1/100$ second. Either at a normal shutter speed where the exposure time is $1/30$ second or at a high shutter speed where the exposure time is shorter than $1/30$ second, continuous flicker on the time axis with intervals of three frames (or three screens) occurs (as if it were vertically advancing when viewed continuously).

If the exposure time is set to an integer multiple of the fluctuation period of the fluorescent-light brightness, i.e., $1/100$ second, but not in excess of one frame (i.e., $1/30$ second), that is, if the exposure time is set to $1/100$ second, $1/50$ second, or $3/100$ second, the amount of exposure is constant regardless of the exposure timing. Thus, flicker, including screen flicker, does not occur.

Flicker for the progressive CMOS imaging apparatus with a vertical sync frequency of 30 Hz and a power supply frequency of 50 Hz, described above, is shown in FIG. 7.

When an object is photographed by a progressive CMOS imaging apparatus having a frame frequency of 30 Hz under fluorescent light in a region where the frequency of the power supply is 60 Hz, although not shown, one frame is $1/30$ second, and the period over which the brightness of fluorescent light fluctuates is $1/120$ second. At a normal shutter speed where the exposure time is $1/30$ second, the amount of exposure is constant regardless of the exposure timing, and flicker, including screen flicker, does not occur. At a high shutter speed where the exposure time is shorter than $1/30$ second, however, one-frame (one-screen) flicker in which flicker in each frame (each screen) has the same fringe pattern occurs.

Even at a high shutter speed, if the exposure time is set to an integer multiple of the fluctuation period of the fluorescent-light brightness, i.e., $1/120$ second, that is, if the exposure time is set to 1/120 second, 1/60 second, or 1/40 second, like at a normal shutter speed where the exposure time is 1/30 second, the amount of exposure is constant regardless of the exposure timing. Thus, flicker, including screen flicker, does not occur.

Flicker for the progressive CMOS imaging apparatus with a vertical sync frequency of 30 Hz and a power supply frequency of 60 Hz, described above, is shown in FIG. 7.

In photographing an object using a CMOS imaging apparatus under fluorescent light, instead of setting the shutter speed so that flicker does not occur, it is also conceivable to reduce the amount of flicker caused in the video signal from an imaging output.

More specifically, when continuous flicker on the time axis with intervals of a plurality of vertical periods (or screens) occurs, shown in FIG. 4 or FIGS. 5A and 5C or 6A and 6C, the continuous flicker is utilized to estimate the flicker component in the video signal of the photographic output, and the video signal of the photographic output is corrected according to the estimation. For example, the gain of the video signal is adjusted according to the estimated flicker component, or the estimated flicker component is subtracted from the video signal. In this way, the amount of flicker component is reduced in the video signal of the photographic-output.

When a still image is taken by a digital video camera or digital still camera capable of taking both motion pictures and still images, all pixels in one screen can be exposed to light at the same timing (more specifically, exposure on all pixels in one screen starts and stops at the same time) even in an XY-address-scanning imaging apparatus such as a CMOS imaging apparatus, and the occurrence of fluorescent flicker is avoided. In this case, unlike taking a motion picture where there are limitations in reading speed, a video signal is slowly read from the imaging device with the shutter mechanically closed to block light.

In an XY-address-scanning imaging apparatus, such as a CMOS imaging apparatus, therefore, in order to set the shutter speed so that flicker does not occur in the video signal from a photographic output or reduce the amount of flicker caused in the video signal, it is necessary to determine whether or not photographing is conducted under fluorescent light, and, if under fluorescent light, it is further necessary to determine whether the frequency of the fluorescent-lamp driving power supply is 50 Hz or 60 Hz.

It is desirable that white balance (WB) adjustment control, auto exposure (AE) adjustment control, etc., be optimized depending upon under fluorescent light or non-fluorescent light. Thus, it is necessary to determine whether or not photographing is conducted under fluorescent light.

One method for determining a photographic environment is disclosed in Japanese Unexamined Patent Application Publication No. 7-336586. In this method, external light is directly measured by a special photometric sensor, and it is determined whether or not a fluctuation component exists in an output signal of the measured light to determine whether or not photographing is conducted under fluorescent light. If it is determined that photographing is conducted under fluorescent light due to the existence of fluctuation component, the frequency of the phosphor-driving power supply is detected by detecting the frequency of the fluctuation component.

The method disclosed in this publication requires a special photometric sensor, and considers connection or communication between the photometric sensor and an imaging apparatus. Therefore, the imaging apparatus must be large and expensive.

Accordingly, demands exist for a method for determining whether or not photographing is conducted under fluorescent light based on the video signal from a photographic output and for detecting the frequency of the fluorescent-lamp driving power supply.

A method disclosed in Japanese Unexamined Patent Application Publication No. 2001-111887 includes:

(1) integrating pixel values in the horizontal screen direction to generate flicker component data with less influence of the background (picture);

(2) averaging the integration data across a plurality of screens to determine an average value corresponding to the background component;

(3) normalizing the integration data using the average value to determine the flicker component data from which influence of the background is removed;

(4) performing a Fourier transform on the flicker component data in the vertical screen direction to extract the spectrum of only the flicker frequency component;

(5) comparing the level of spectrum with a threshold value to determine whether or not flicker occurs, that is, whether or not photographing is conducted under fluorescent light, and determining whether the frequency of the fluorescent-lamp driving power supply is 50 Hz or 60 Hz; and (6) changing the shutter speed according to the determination to prevent the occurrence of flicker.

A method disclosed in Japanese Unexamined Patent Application Publication No. 2002-84466 includes:

(1) integrating pixel values in the horizontal screen direction to determine an integration value with less influence of the background (picture);

(2) determining a flicker index value from the amount of change in the integration value from frame to frame according to a particular evaluation formula;

(3) determining whether or not flicker occurs, that is, whether or not photographing is conducted under fluorescent light, and determining whether the frequency of the fluorescent-lamp driving power supply is 50 Hz or 60 Hz based on the determined flicker index value; and (4) changing the shutter speed according to the determination to prevent the occurrence of flicker.

However, the method disclosed in Japanese Unexamined Patent Application Publication No. 2001-111887 or No. 2002-84466 does not overcome the problem of one-screen flicker shown in FIGS. 5B and 5D or 6B and 6D in which flicker in each screen has the same fringe pattern. When such flicker occurs, a picture (background) component and a flicker component are not distinguished in the video signal of the photographic output, and no fluctuation component is detected across fields of the video signal. In this case, it cannot be determined that photographing is conducted under fluorescent light.

In order to solve this problem, Japanese Unexamined Patent Application Publication No. 2002-84466 discloses a method in Embodiment 2, including:

(0) initially, setting the shutter speed to an integer multiple of 1/120 second;

(1) in this setting, integrating pixel values in the horizontal screen direction to determine an integrated value with less influence of the background (picture);

(2) determining a flicker index value from the amount of change in the integrated value from frame to frame according to a particular evaluation formula;

(3) determining whether or not photographing is conducted under fluorescent light with a power supply frequency of 50 Hz based on the determined flicker index value;

(4) if it is determined that photographing is conducted under fluorescent light with a power supply frequency of 50 Hz, setting the shutter speed to an integer multiple of 1/100 second; and (5) if it is determined that photographing is not conducted under fluorescent light with a power supply frequency of 50 Hz, setting the shutter speed to an integer multiple of 1/120 second, at which flicker does not occur under fluorescent light with a power supply frequency of 60 Hz.

This method also has a problem, however. If photographing is not conducted under fluorescent light with a power supply frequency of 50 Hz, the shutter speed is set to an integer multiple of 1/120 second without determining whether or not photographing is conducted under fluorescent light with a power supply frequency of 60 Hz. Thus, if photographing is not conducted under fluorescent light with a power supply frequency of 50 Hz or 60 Hz, or if photographing is conducted under non-fluorescent light where flicker does not occur, the shutter speed is limited more than necessary. In this method, information about whether or not photographing is conducted under fluorescent light is not finally obtained, although this information is useful for WB adjustment control and AE adjustment control.

SUMMARY OF THE INVENTION

Accordingly, it is an object of the present invention to provide a method for determining a photographic environment of an XY-address-scanning imaging apparatus, such as a CMOS imaging apparatus, which ensures that it can be easily determined whether or not photographing is conducted under fluorescent light and, if photographing is conducted under fluorescent light, whether the frequency of fluorescent-lamp driving power supply is 50 Hz or 60 Hz.

In a first aspect of the present invention, a method for determining a photographic environment when an object is photographed by an imaging apparatus including an XY-address-scanning imaging device includes a first step of setting a shutter speed of the imaging device to a first shutter speed according to a vertical sync frequency of the imaging device, a second step of integrating a video signal obtained from the imaging device at the first shutter speed within a screen area to determine an integration value, and normalizing the determined integration value by an average value of a plurality of integration values to determine a first normalized integration value, the plurality of integration values being obtained in a plurality of successive vertical sync periods, a third step of extracting a first frequency component from the first normalized integration value to determine whether or not the first frequency component has a higher level than a first threshold value, a fourth step of setting the shutter speed of the imaging device to a second shutter speed different from the first shutter speed when it is determined that the level of the first frequency component is equal to or lower than the first threshold value, a fifth step of integrating a video signal obtained from the imaging device at the second shutter speed within a screen area to determine an integration value, and normalizing the determined integration value by the average value used in the second step to determine a second normalized integration value, and a sixth step of extracting a second frequency component from the second normalized integration value to determine whether or not the second frequency component has a higher level than a second threshold value.

When the imaging apparatus is an imaging apparatus having a vertical sync frequency of 120/J Hz, such as an NTSC imaging apparatus or a progressive imaging apparatus having a frame frequency of 30 Hz, it may-be determined in the third step whether or not photographing is conducted under fluorescent light with a power supply frequency of 50 Hz by determining whether or not the level of the first frequency component is higher than the first threshold value, and it may be determined in the sixth step whether or not photographing is conducted under fluorescent light with a power supply frequency of 60 Hz by determining whether or not the level of the second frequency component is higher than the second threshold value.

When the imaging apparatus is an imaging apparatus having a vertical sync frequency of 100/J Hz, such as a PAL imaging apparatus, it may be determined in the third step whether or not photographing is conducted under fluorescent light with a power supply frequency of 60 Hz by determining whether or not the level of the first frequency component is higher than the first threshold value, and it may be determined in the sixth step whether or not photographing is conducted under fluorescent light with a power supply frequency of 50 Hz by determining whether or not the level of the second frequency component is higher than the second threshold value.

In a second aspect of the present invention, an imaging apparatus including an XY-address-scanning imaging device includes a control unit that sets a shutter speed of the imaging device, an integrating unit that integrates a video signal obtained by the imaging device within a screen area to determine an integration value, an average determining unit that determines an average value of a plurality of integration values obtained in a plurality of successive vertical sync periods, a normalizing unit that normalizes the integration value by the average value determined by the average determining unit to determine a normalized integration value, and an extracting unit that extracts a frequency component from the normalized integration value. The control unit sets the shutter speed of the imaging device to a first shutter speed according to a vertical sync frequency of the imaging device. The control unit determines whether or not a first frequency component extracted based on a video signal obtained at the first shutter speed has a higher level than a first threshold value. When the level of the first frequency component is equal to or lower than the first threshold value, the control unit sets the shutter speed of the imaging device to a second shutter speed different from the first shutter speed. The control unit determines whether or not a second frequency component extracted based on a video signal obtained at the second shutter speed has a higher level than a second threshold value.

According to the present invention, therefore, when an object is photographed by an XY-address-scanning imaging apparatus such as a CMOS imaging apparatus, it can be determined whether or not photographing is conducted under fluorescent light, and, if under fluorescent light, it can further be determined whether the frequency of the fluorescent-lamp driving power supply is 50 Hz or 60 Hz, in a simple and reliable manner.

It can be determined whether or not photographing is conducted under fluorescent light with a power supply frequency of 50 Hz, and it can also be determined whether or not photographing is conducted under fluorescent light with a power supply frequency of 60 Hz. Thus, if it is determined that photographing is conducted under non-fluorescent light, normal shutter control can be performed to set the shutter speed to a desired value. Unlike the related art, the shutter speed is not limited more than necessary when photographing is conducted under non-fluorescent light where flicker does not occur.

Since information about whether or not photographing is conducted under fluorescent light is finally obtained, this information can be used for WB adjustment control and AE adjustment control.

BRIEF DESCRIPTION OF THE DRAWINGS

FIG. 7 is a table showing flicker in some types of CMOS imaging apparatuses;

DESCRIPTION OF THE PREFERRED EMBODIMENTS

Figure 8:
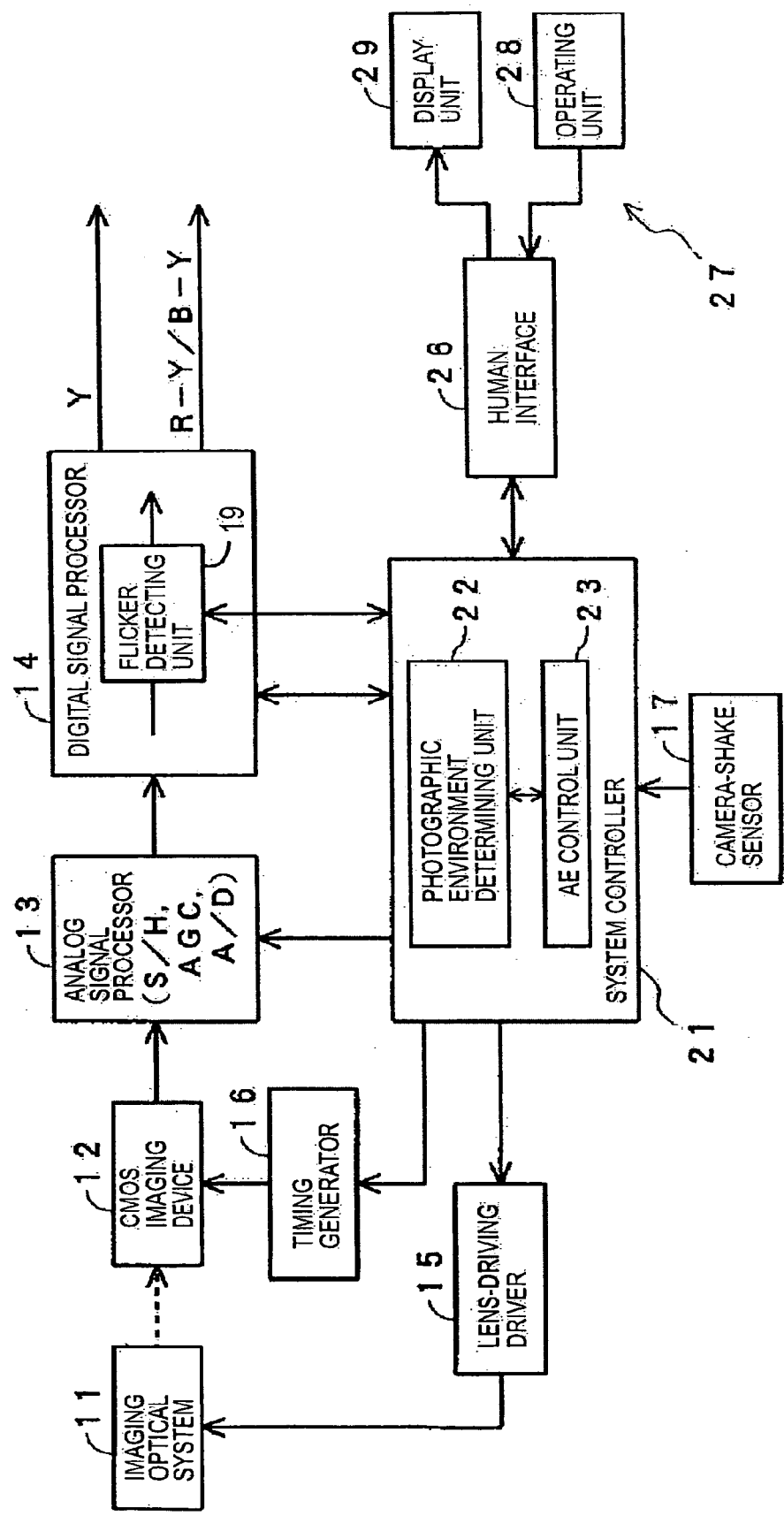
FIG. 8 is a block diagram showing the system configuration of an imaging apparatus according to the present invention.

FIG. 8 is a block diagram showing the system configuration of an imaging apparatus according to the present invention. The imaging apparatus includes an XY-address-scanning imaging device, namely, a CMOS imaging device 12.

In this imaging apparatus, light from an object is directed into the CMOS imaging device 12 via an imaging optical system 11. The directed light is photoelectrically converted by the CMOS imaging device 12 into an analog video signal composed of primary color signals of R (red), G (green), and B (blue) or complementary color signals.

The CMOS imaging device 12 includes a two-dimensional array of a plurality of pixels on a CMOS substrate, each pixel having a photodiode (photogate), a transfer gate (shutter transistor), a switching transistor (address transistor), an amplifier transistor, a reset transistor (reset gate), and so on. The CMOS imaging device 12 also includes a vertical scanning circuit, a horizontal scanning circuit, and a video signal output circuit.

The analog video signal from the CMOS imaging device 12 is input to an analog signal processor 13 formed as an IC (integrated circuit). In the analog signal processor 13, the analog video signal is sampled-and-held color-by-color, whose gain is controlled by an automatic gain control (AGC), and is converted into a digital signal by an analog-to-digital (A/D) converter.

The digital video signal from the analog signal processor 13 is input to a digital signal processor 14 formed as an IC for clamping, gain adjustment, WB adjustment, and gamma correction (grayscale conversion), etc. Finally, the digital signal processor 14 outputs a luminance signal Y and color difference signals R-Y and B-Y of red and blue.

The digital signal processor 14 includes a flicker detecting unit 19. The flicker detecting unit 19 is controlled by a system controller 21 to perform a flicker detecting process described below for use in determining a photographic environment.

The system controller 21 is composed of a microcomputer or the like, and serves to control camera components.

Specifically, the system controller 21 supplies a lens driving control signal to a lens-driving driver 15 formed as an IC, and the lens-driving driver 15 drives a lens and an iris in the imaging optical system 11.

The system controller 21 also supplies a timing control signal to a timing generator 16. The timing generator 16 supplies various timing signals to the CMOS imaging device 12 to drive the CMOS imaging device 12.

The system controller 21 receives a detection signal of a video signal from the digital signal processor 14. In response to an AGC signal from the system controller 21, the gain of each color signal is controlled in the analog signal processor 13. The signal processing of the digital signal processor 14 is controlled by the system controller 21.

The system controller 21 is connected with a camera-shake sensor 17. Camera shake information obtained from the camera-shake sensor 17 is used for camera shake correction.

The system controller 21 is also connected with a user interface 27 including an operating unit 28 and a display unit 29 via a human interface 26 composed of a microcomputer or the like. A setting operation, a selecting operation, etc., in the operating unit 28 are detected by the system controller 21, and the camera states such as the setting state and the control state are displayed on the display unit 29 by the system controller 21.

The system controller 21 functionally includes a photographic environment determining unit 22 and an AE control unit 23. The photographic environment determining unit 22 determines a photographic environment in the manner described below, and the AE control unit 23 sets the electronic shutter speed (exposure time) of the CMOS imaging device 12 at the actual photographing time.

The imaging apparatus having this system configuration may be (a) an imaging apparatus that is selectively set to the NTSC or PAL format when it is shipped, (b) an imaging apparatus that is initially fixed to either the NTSC or PAL format, (c) a progressive imaging apparatus having a frame frequency of 30 Hz, or the like depending upon the video format.

In the imaging apparatus that is selectively set to either the NTSC or PAL format when it is shipped, a setting flag indicating the setting state is stored in the system controller 21, and is used when the photographic environment determining unit 22 determines a photographic environment and when the AE control unit 23 sets the shutter speed.

In the following description, the set or determined vertical sync frequency of the imaging apparatus (which indicates a field frequency of 60 Hz for the NTSC type, a field frequency of 50 Hz for the PAL type, and a frame frequency for the progressive type) is represented by fv, and the frequency of the AC power supply (50 Hz or 60 Hz) for driving fluorescent lamps is represented by fp.

A method for determining a photographic environment according to the present invention, including a flicker detecting process of the flicker detecting unit 19, will now be described with reference to FIGS. 9 to 21, in the context of, first, an imaging apparatus that is selectively set to either the NTSC or PAL format when it is shipped, and then an imaging apparatus that is initially fixed to either the NTSC or PAL format, followed by a progressive imaging apparatus having a frame frequency of 30 Hz.

In the following description, symbol N in association with the shutter speed is a positive integer, where the shutter speed (exposure time) is within one vertical period (1/60 second for the NTSC type, 1/50 second for the PAL type, and 1/30 second for the progressive type with a frame frequency of 30 Hz).

Figure 9:
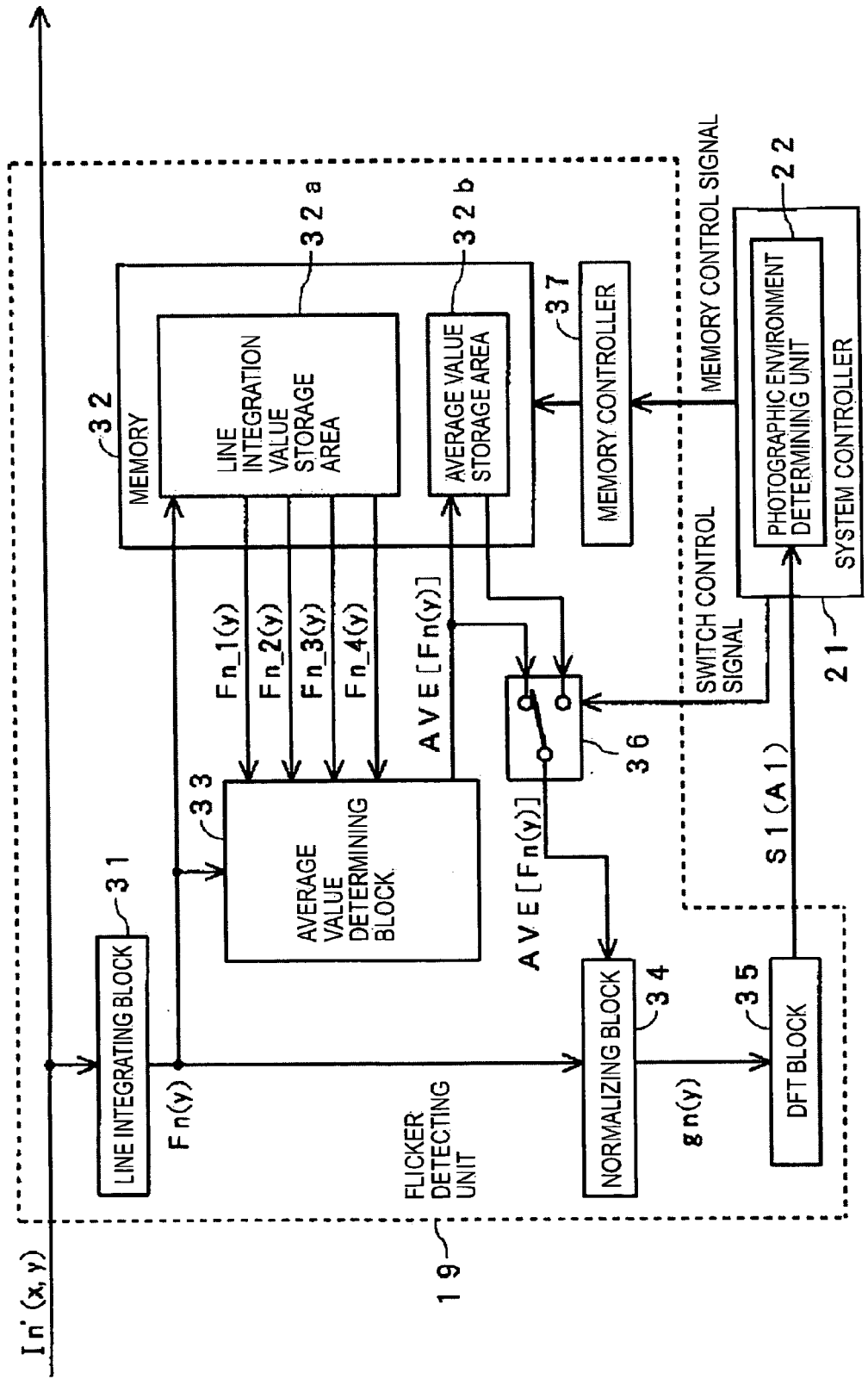
FIG. 9 is a block diagram of a flicker detecting unit of the imaging apparatus shown in FIG. 8.

FIG. 9 shows the structure of the flicker detecting unit 19 shown in FIG. 8.

The flicker detecting unit 19 includes a line integrating block 31, a memory 32, an average value determining block 33, a normalizing block 34, a DFT (discrete Fourier transform) block 35, a switch 36, and a memory controller 37.

In this example, an input signal of the flicker detecting unit 19 is a luminance signal that is determined in the digital signal processor 14. The input signal may be a color signal. However, if it is determined whether or not a flicker component exists only from a particular color signal, false detection can occur. This is because, as described above, the level of the fluorescent flicker component differs from one color to another, and, in some fluorescent lamps, a particular color component does not substantially vary.

In case of a color signal used as an input signal of the flicker detecting unit 19, desirably, a flicker detecting process described below is performed not only on a particular color signal but also on a plurality of color signals, e.g., the flicker detecting process is individually performed on the color signals of R, G, and B. If a flicker component is detected in at least one of the plurality of color signals, it is determined that photographing is conducted under fluorescent light.

Figure 1:
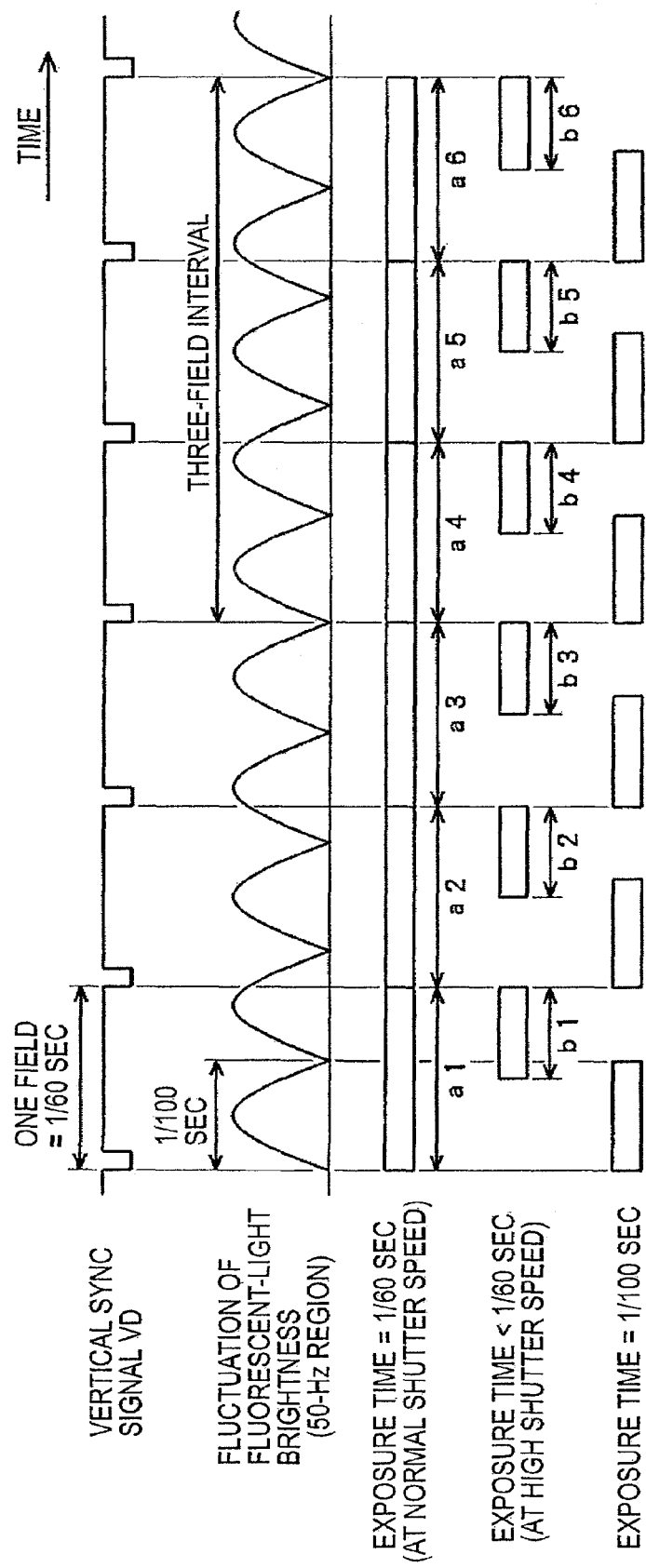
FIG. 1 is a timing chart for showing fluorescent flicker in an NTSC CCD imaging apparatus having a vertical sync frequency of 60 Hz.
Figure 2:
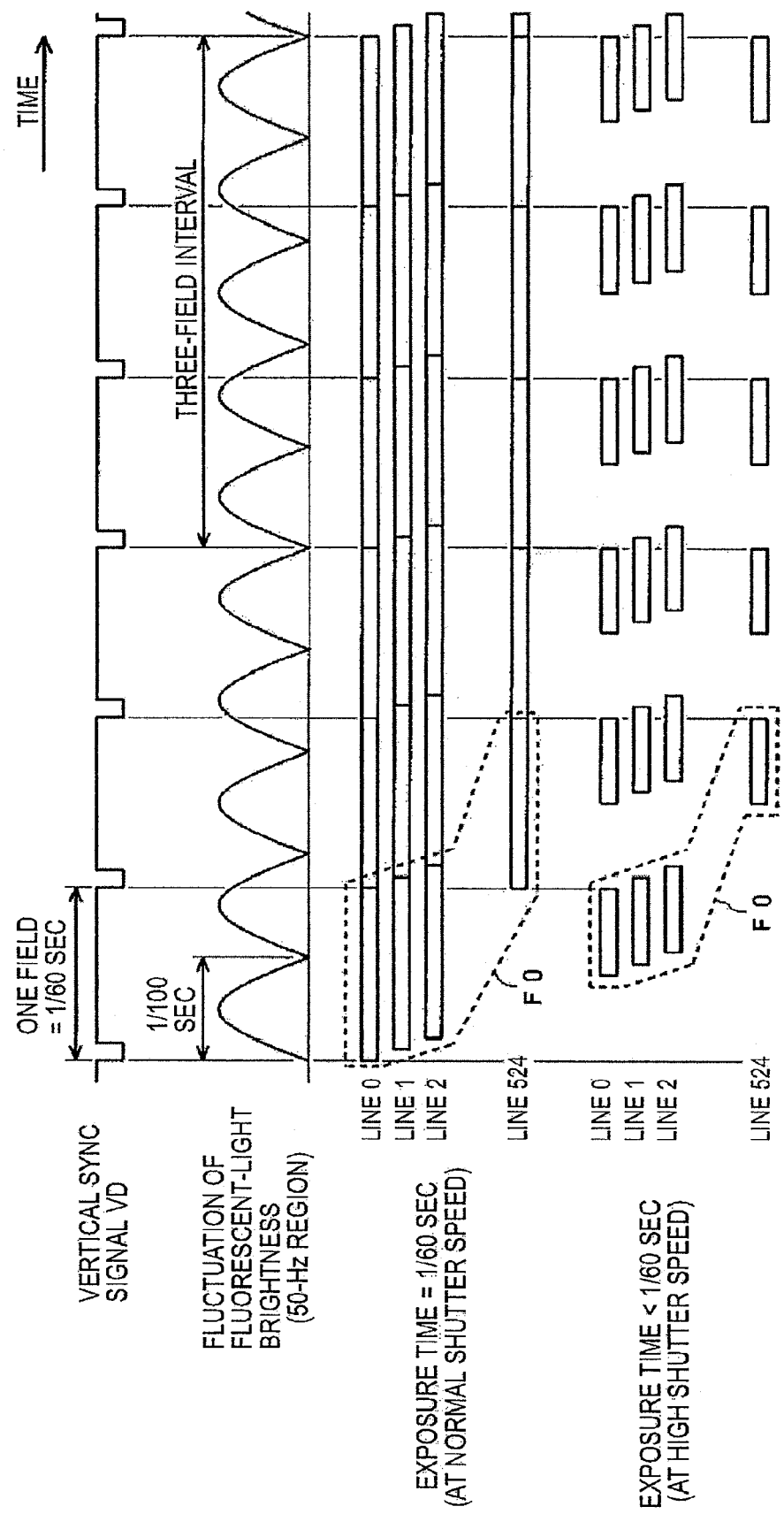
FIG. 2 is a timing chart for showing fluorescent flicker in an NTSC CMOS imaging apparatus having a vertical sync frequency of 60 Hz.
Figure 3:
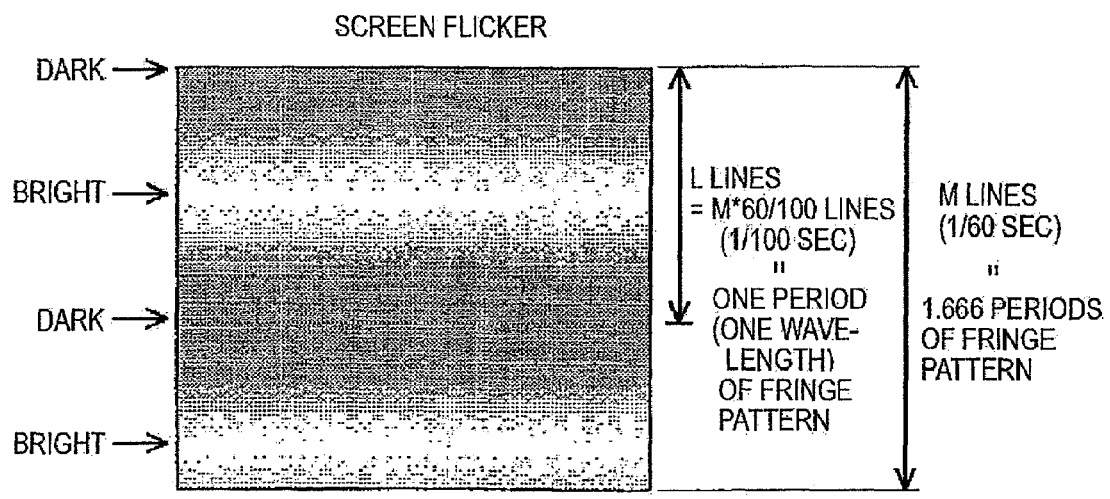
FIG. 3 is an illustration of a fringe pattern of fluorescent flicker within one screen in the CMOS imaging apparatus.
Figure 4:
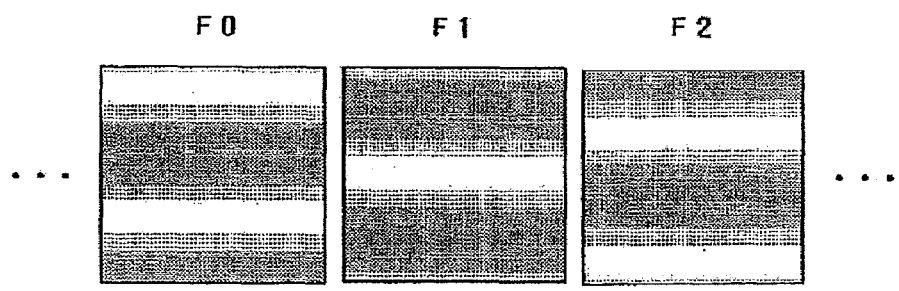
FIG. 4 is an illustration of a fringe pattern of fluorescent flicker across three screens in the CMOS imaging apparatus.

While FIGS. 3 and 4 show flicker in a case where an object is formed of uniform patterns, generally, the flicker component is in proportion to the signal intensity of an object.

In FIG. 9, an input signal of the flicker detecting unit 19 at a field n and a pixel (x, y) of a typical object is represented by In'(x, y). The input signal In'(x, y) equals the sum of a signal component containing no flicker component and a flicker component in proportion to the signal component, and is given as follows:

$$In'(x,y) = [1 + \Gamma n(y)] * In(x,y) \quad \text{Eq. 1}$$

where In(x, y) indicates the signal component, and $\Gamma n(y) * In(x, y)$ indicates the flicker component, where $\Gamma n(y)$ denotes the flicker factor. One horizontal period is much shorter than the fluorescent-light illumination period (1/100 second at fp=50 Hz or 1/120 second at fp=60 Hz), and the flicker factor can be regarded as constant on the same line in the same field.

The flicker factor $\Gamma n(y)$ can be generalized using Fourier expansion into the form given below, thereby expressing the flicker factor in a form including the illumination and afterglow characteristics, which differ depending upon the type of fluorescent lamp:

$$\Gamma n(y) = \sum_{m=0}^{\infty} \gamma m * \cos[m * (2\pi/\lambda o) * y + \Phi mn] \quad \text{Eq. 2}$$

$$= \sum_{m=0}^{\infty} \gamma m * \cos(m * \omega o * y + \Phi mn)$$

where $\lambda_0$ indicates the wavelength of screen flicker, e.g., that shown in FIG. 3. Letting the number of lines read per field be M (one field corresponds to 1/60 second for the NTSC type, and to 1/50 second for the PAL type), the wavelength $\lambda_0$ corresponds to (M*fv/100) lines at fp=50 Hz and to (M*fv/120) lines at fp=60 Hz. In Eq. 2, $\omega_0$ indicates the normalized angular frequency that is normalized by the wavelength $\lambda_0$.

In Eq. 2, $\gamma_m$ indicates the amplitude of the flicker component at each order (m=1, 2, 3 . . . ), and $\Phi_{mn}$ indicates the initial phase of the flicker component at each order, which is defined by the fluorescent-light illumination period and the exposure timing.

Figure 5A:
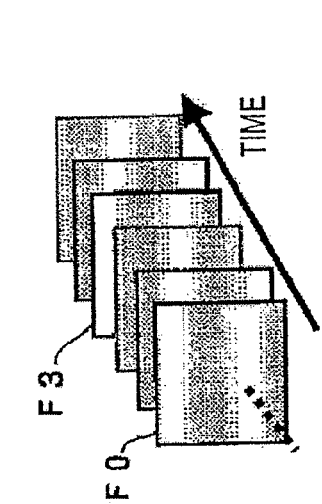
FIGS. 5A and 5B are timing charts for showing flicker in an NTSC CMOS imaging apparatus having a vertical sync frequency of 60 Hz.
Figure 5C:
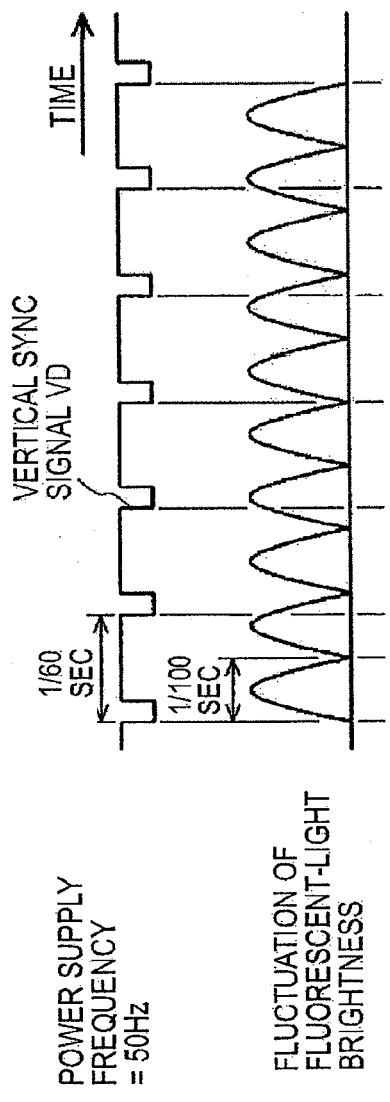
FIGS. 5C and 5D are illustrations of the flicker across screens.

(a) At fp=50 Hz and fv=60 Hz (i.e., the NTSC type), the initial phase $\Phi_{mn}$ has the same value every three fields, as shown in FIGS. 5A and 5C, and the difference in initial phase $\Phi_{mn}$ from the previous field, i.e., $\Delta\Phi_{mn}$, is given by Eq. 3(a) as follows:

$$\Delta\Phi mn = 0 [fp=60\ Hz, fv=60\ Hz, 30\ Hz] \quad \text{Eq. 3(a)}$$

Figure 5B:
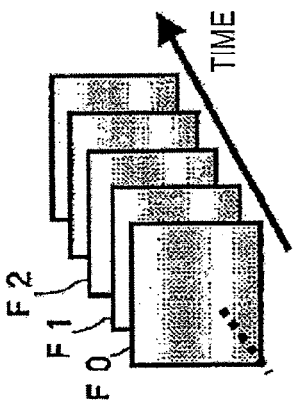
Figure 5D:
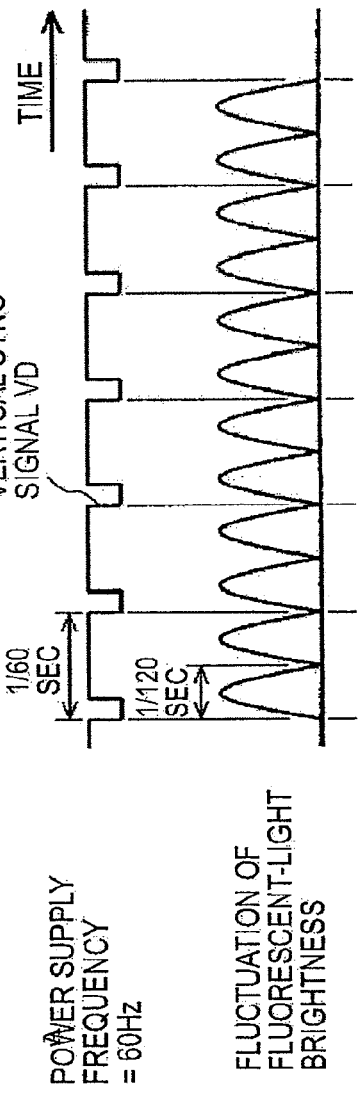

(b) At fp=60 Hz and fv=60 Hz (i.e., the NTSC type), the initial phase $\Phi_{mn}$ has the same value in each field, as shown in FIGS. 5B and 5D, and the difference in initial phase $\Phi_{mn}$ from the previous field, i.e., $\Delta\Phi_{mn}$, is given by Eq. 3(b) as follows:

$$\Delta\Phi mn = (-2\pi/3) * m [fp=50\ Hz, fv=60\ Hz, 30\ Hz] \quad \text{Eq. 3(b)}$$

Figure 6A:
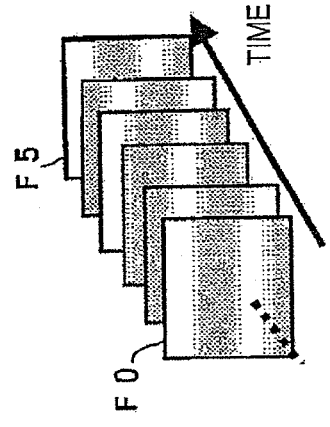
FIGS. 6A and 6B are timing charts for showing flicker in a PAL CMOS imaging apparatus having a vertical sync frequency of 50 Hz.
Figure 6C:
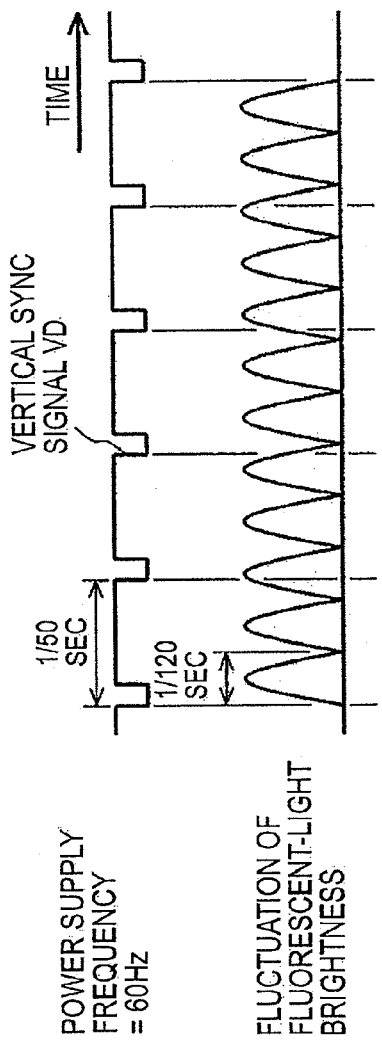
FIGS. 6C and 6D are illustrations of the flicker across screens.
Figure 6B:
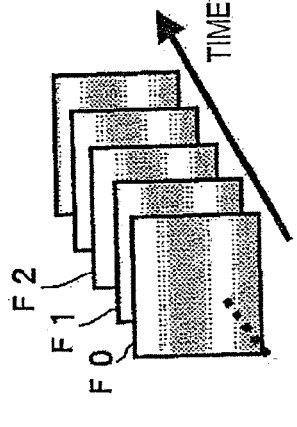
Figure 6D:
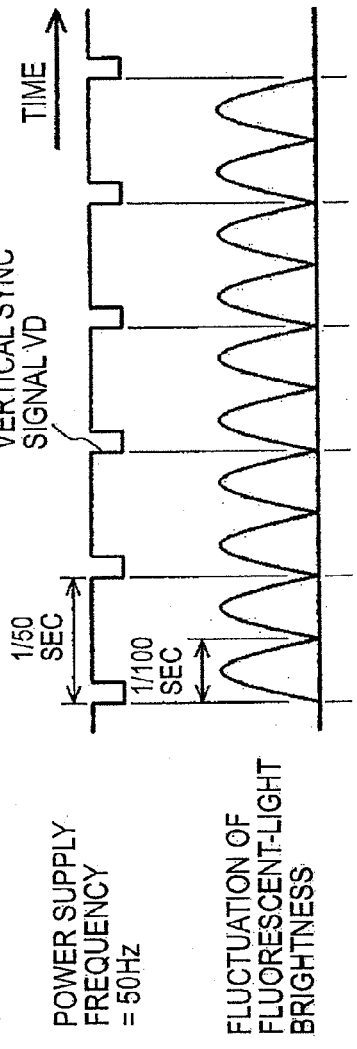

(c) At fp=50 Hz and fv=50 Hz (i.e., the PAL type), the initial phase $\Phi_{mn}$ has the same value in each field, as shown in FIGS. 6B and 6D, and the difference in initial phase $\Phi_{mn}$ from the previous field, $\Delta\Phi_{mn}$, is given by Eq. 3(c) as follows:

$$\Delta\Phi mn = 0 [fp=50\ Hz, fv=50\ Hz] \quad \text{Eq. 3(c)}$$

(d) At fp=60 Hz and fv=50 Hz (i.e., the PAL type), the initial phase $\Phi_{mn}$ has the same value every five fields, as shown in FIGS. 6A and 6C, and the difference in initial phase $\Phi_{mn}$ from the previous field, i.e., $\Delta\Phi_{mn}$, is given by Eq. 3(d) as follows:

$$\Delta\Phi mn = (-2\pi/5) * m [fp=60\ Hz, fv=50\ Hz] \quad \text{Eq. 3(d)}$$

A photographic environment determining process of the photographic environment determining unit 22 will now be described.

When the power supply of the imaging apparatus is turned on or when the object information (i.e., the brightness of the object or color temperature) greatly changes to cause a change in the photographic environment, the photographic environment determining unit 22 in the system controller 21 performs a photographic environment determining process to determine whether photographing is conducted (1) under fluorescent light with fp=50 Hz, (2) under fluorescent light with fp=60 Hz, or (3) under non-fluorescent light.

Figure 10:
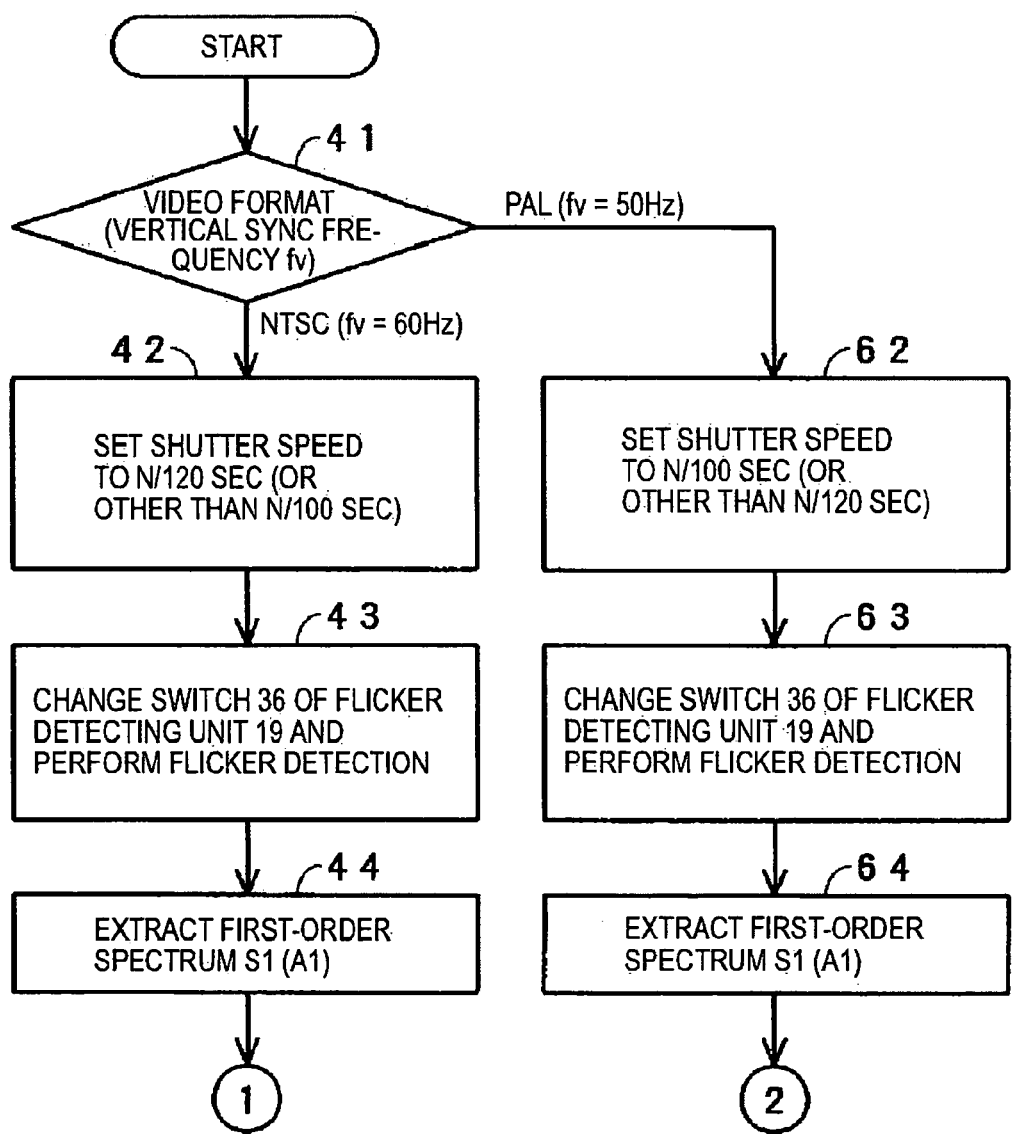
FIG. 10 is a flowchart showing a photographic environment determining process routine for the NTSC or PAL type.
Figure 11:
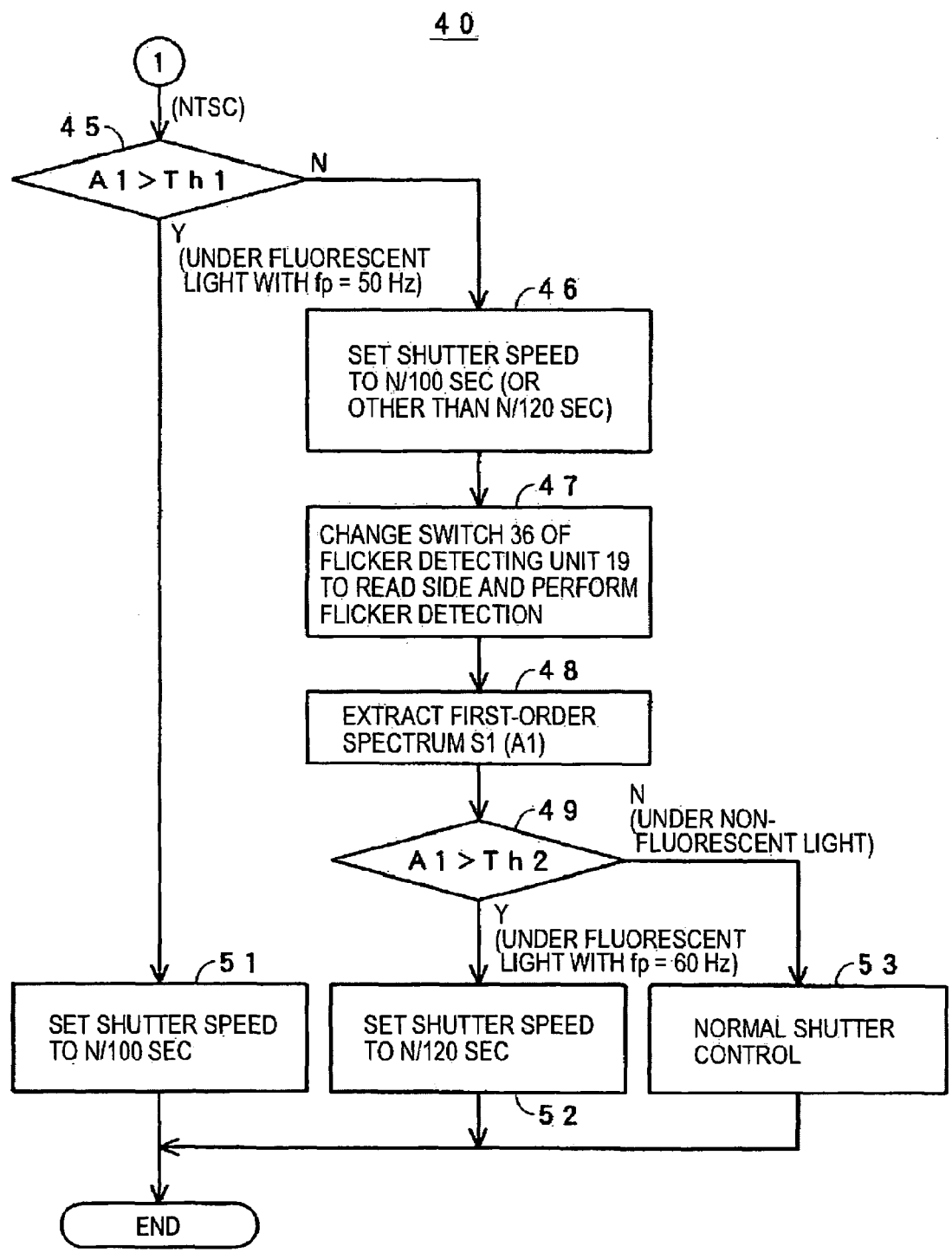
FIG. 11 is a flowchart showing the subsequent photographic environment determining process routine for the NTSC type.
Figure 12:
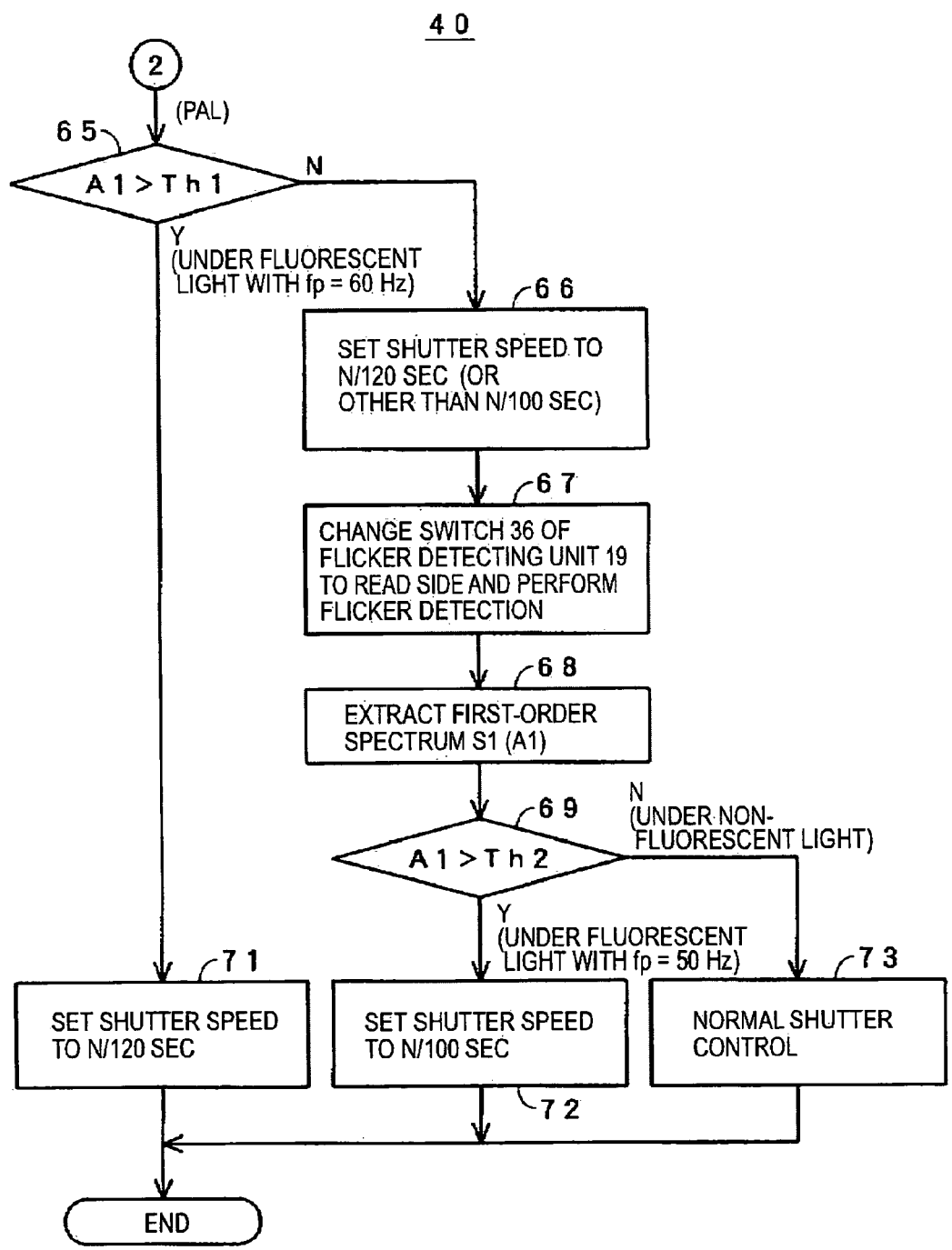
FIG. 12 is a flowchart showing the subsequent photographic environment determining process routine for the PAL type.

FIGS. 10 to 12 are flowcharts showing a photographic environment determining process routine 40 of an imaging apparatus that is selectively set to either the NTSC or PAL format when it is shipped.

In the photographic environment determining process routine 40, first, in step 41, the photographic environment determining unit 22 determines whether the video format (vertical sync frequency fv) set in the imaging apparatus is the NTSC format (fv=60 Hz) or the PAL format (fv=50 Hz) based on the setting flag described above.

If it is determined in step 41 that the NTSC format is set, in step 42, the electronic shutter speed of the CMOS imaging device 12 is set to a first shutter speed for determination, which is N/120 second (specifically, 1/120 second or 1/60 second) where continuous flicker on the time axis with intervals of three fields occurs under fluorescent light with fp=50 Hz, as shown in the first row of FIG. 7. Then, the routine proceeds to step 43.

If it is determined in step 41 that the PAL format is set, in step 62, the electronic shutter speed of the CMOS imaging device 12 is set to a first shutter speed for determination, which is N/100 second (specifically, 1/100 second or 1/50 second) where continuous flicker on the time axis with intervals of five fields occurs under fluorescent light with fp=60 Hz, as shown in the fourth row of FIG. 7. Then, the routine proceeds to step 63.

In step 43 or 63, the object is photographed at the first shutter speed set in step 42 or 62, and the flicker detecting unit 19 performs a flicker detecting process. In this case, the switch 36 of the flicker detecting unit 19 is changed to the side shown in FIG. 9:

In the flicker detecting process at the first shutter speed, in order to reduce the influence of the picture (background) component, first, the line integrating block 31 integrates the input signal In'(x, y) in the horizontal screen direction to determine a line integration value Fn(y).

In this integration, it is desirable that a larger number of pixels be integrated per line in order to reduce the influence of disturbance. Although pixels are integrated line-by-line in this example, the integration may not be performed line-by-line. The integration may be performed across a plurality of lines as long as sampling intervals can be obtained such that variations caused by the cosine term in Eq. 2 become negligible, that is, such that the line integration value Fn(y) sufficiently indicates the flicker component. The integration performed across a plurality of lines can further suppress the influence of disturbance and reduce the required capacity of the memory 32 to reduce the number of DFT operations described below.

The reason that the input signal In'(x, y) is integrated in the horizontal screen direction is that the CMOS imaging device 12 is scanned in the vertical screen direction while it is scanned in the horizontal screen direction and that, as shown in FIGS. 3 and 4, the flicker fringe pattern itself lies in the horizontal screen direction while the fringes change in the vertical screen direction. For example, conversely, if the CMOS imaging device 12 is scanned in the horizontal screen direction while it is scanned in the vertical screen direction, the flicker fringes themselves lie in the vertical screen direction while the fringes change in the horizontal screen direction. In this case, the input signal In'(x, y) is integrated in the vertical screen direction. The term "vertical" in the vertical sync frequency and the vertical period means one screen.

The line integration value Fn(y) is given by the following equation:

$$Fn(y) = \sum_x In'(x, y) = \sum_x \{[1 + \Gamma n(y)] * In(x, y)\} \qquad \text{Eq. 4}$$
$$= \sum_x In(x, y) + \Gamma n(y) * \sum_x In(x, y)$$
$$= \alpha n(y) + \alpha n(y) * \Gamma n(y)$$

where $\alpha n(y)$ indicates the line integration value of the signal component (background component) In(x, y), and is given by the following equation:

$$\alpha n(y) = \sum_x In(x, y) \qquad \text{Eq. 5}$$

If the object is formed of uniform patterns, the line integration value $\alpha n(y)$ of the signal component In(x, y) has a fixed value. In this case, the flicker component $\alpha n(y)*\Gamma n(y)$ can easily be extracted from the line integration value Fn(y) of the input signal In'(x, y).

In general objects, however, the line integration value $\alpha n(y)$ also contains the "m*ωo" component, and the luminance component and color component of the flicker component are not separated from the luminance component and color component of the signal component (background component) of the object itself. Thus, only the flicker component cannot be extracted. Moreover, in Eq. 4, the flicker component in the second term is much smaller than the signal component in the first term, and the flicker component is substantially buried in the signal component.

Figure 19:
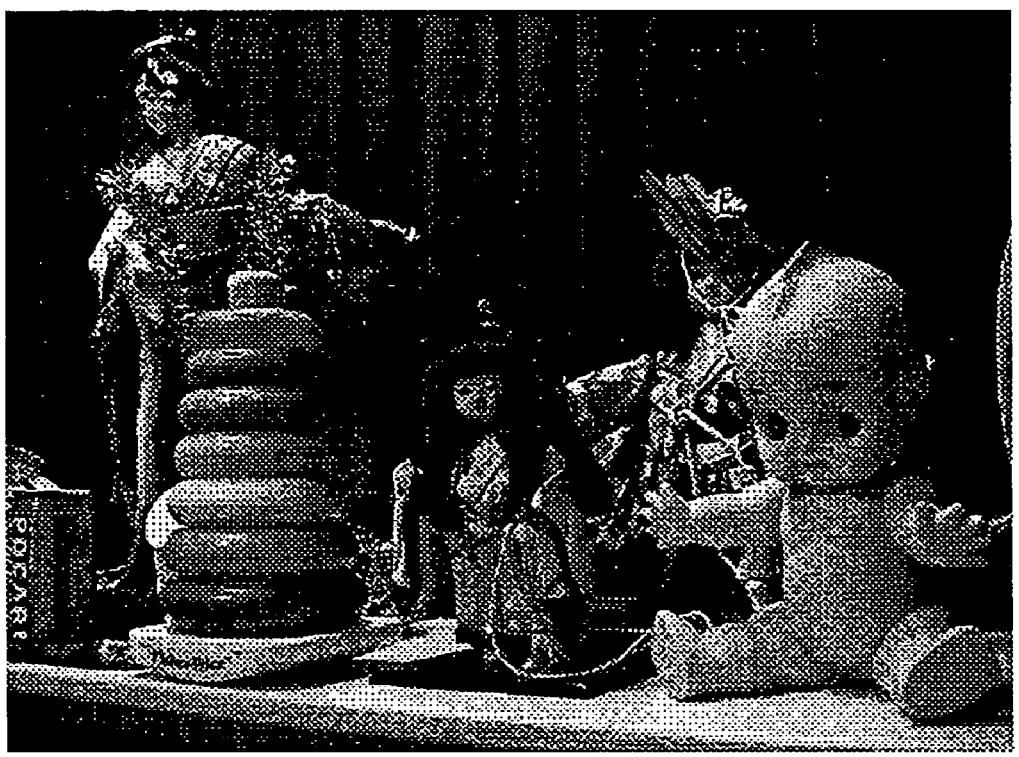
FIG. 19 is an illustration of an object to be photographed.
Figure 20:
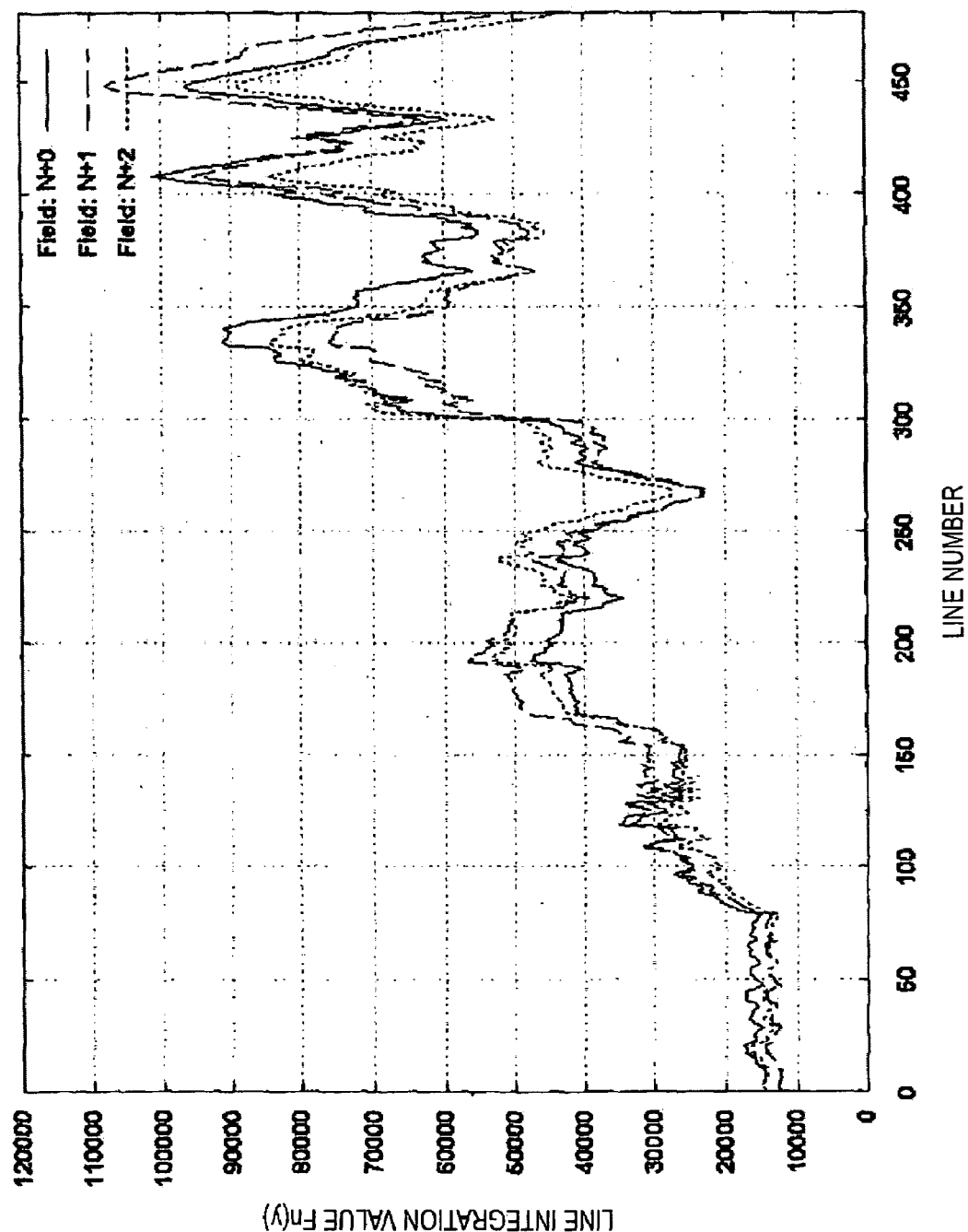
FIG. 20 is a graph showing a line integration value obtained when the object shown in FIG. 19 is photographed.

The line integration value Fn(y) determined when an object shown in FIG. 19 is photographed by an NTSC CMOS imaging apparatus under fluorescent light with fp=50 Hz is shown in FIG. 20. In the graph shown in FIG. 20, "Field: N+0" indicated by a solid line, "Field: N+1" indicated by a broken line, and "Field: N+2" indicated by a dotted line represent first, second, and third fields in three successive fields, respectively. As can be seen from the graph shown in FIG. 20, it is impossible to extract the flicker component directly from the line integration value Fn(y).

Thus, a process for removing the influence of the background component $\alpha n(y)$ from the line integration value Fn(y) is performed.

In this process, first, the system controller 21 controls the memory controller 37 to write the line integration value Fn(y) output from the line integrating block 31 into a line integration value storage area 32a of the memory 32.

In the NTSC type, preferably, the line integration value storage area 32a stores at least two fields of line integration values because continuous flicker on the time axis with intervals of three fields occurs under fluorescent light with fp=50 Hz unless the shutter speed is N/100 second, as shown in the first row of FIG. 7 (see FIGS. 5A and 5C).

In the PAL type, preferably, the line integration value storage area 32a stores at least four fields of line integration values because continuous flicker on the time axis with intervals of five fields occurs under fluorescent light with fp=60 Hz unless the shutter speed is N/120 second, as shown in the fourth row of FIG. 7 (see FIGS. 6A and 6C).

In a CMOS imaging apparatus that is selectively set to either the NTSC or PAL format when it is shipped, therefore, preferably, the line integration value storage area 32a stores at least four fields of line integration values.

The memory controller 37 sequentially writes the line integration value Fn(y) into the line integration value storage area 32a each time the processing for one field finishes, and reads the line integration value Fn(y) from the line integration value storage area 32a at the subsequent or later field.

In FIG. 9, the line integration values read from the line integration value storage area 32a one, two, three, and four fields previous to the current field are indicated by Fn_1(y), Fn_2(y), Fn_3(y), and Fn_4(y), respectively.

In the flicker detecting unit 19, furthermore, in order to extract the background component (signal component), the average value determining block 33 averages the current line integration value Fn(y) obtained from the line integrating block 31 and the previous line integration values read from the line integration value storage area 32a to determine an average value AVE[Fn(y)] of the line integration values for a plurality of successive fields.

More specifically, in the NTSC type, continuous flicker on the time axis with intervals of three fields occurs under fluorescent light with fp=50 Hz, and the line integration values Fn(y), Fn_1(y), and Fn_2(y) for three successive fields are averaged to determine an average value AVE[Fn(y)].

In the PAL type, continuous flicker on the time axis with intervals of five fields occurs under fluorescent light with fp=60 Hz, and the line integration values Fn(y), Fn_1(y), Fn_2(y), Fn_3(y), and Fn_4(y) for five successive fields are averaged to determine an average value AVE[Fn(y)].

In the NTSC type, therefore, the flicker component is cancelled from the phase relationship given in Eq. 3(a) between the flicker components under fluorescent light with fp=50 Hz, and only the background component αn(y) can be extracted as the average value AVE[Fn(y)], as follows:

$$AVE[Fn(y)] = (1/3)\sum_{k=0}^{2} Fn\_k(y) \quad \text{Eq. 6}$$

$$= (1/3)\left\{\sum_{k=0}^{2} \alpha n\_k(y) + \alpha n\_k(y) * \Gamma n\_k(y)\right\}$$

$$= (1/3)\sum_{k=0}^{2} \alpha n\_k(y) +$$

$$(1/3)\sum_{k=0}^{2} \alpha n\_k(y) * \Gamma n\_k(y)$$

$$= \alpha n(y) + (1/3) * \alpha n(y) \sum_{k=0}^{2} \Gamma n\_k(y)$$

$$= \alpha n(y)$$

where $$\alpha n(y) \approx \alpha n\_1(y) \approx \alpha n\_2(y)$$

In the PAL type, the flicker component is cancelled from the phase relationship given by Eq. 3(d) between the flicker components under fluorescent light with fp=60 Hz, and only the background component αn(y) can be extracted as the average value AVE[Fn(y)], as follows:

$$AVE[Fn(y)] = (1/5)\sum_{k=0}^{4} Fn\_k(y) \quad \text{Eq. 7}$$

$$= (1/5)\left\{\sum_{k=0}^{4} \alpha n\_k(y) + \alpha n\_k(y) * \Gamma n\_k(y)\right\}$$

$$= (1/5)\sum_{k=0}^{4} \alpha n\_k(y) +$$

$$(1/5)\sum_{k=0}^{4} \alpha n\_k(y) * \Gamma n\_k(y)$$

$$= \alpha n(y) + (1/5) * \alpha n(y) \sum_{k=0}^{4} \Gamma n\_k(y)$$

$$= \alpha n(y)$$

where $$\alpha n(y) \approx \alpha n\_1(y) \approx \alpha n\_2(y) \approx \alpha n\_3(y) \approx \alpha n\_4(y)$$

Therefore, only the background component αn(y) can be extracted as the average value AVE[Fn(y)] by setting the shutter speed of the CMOS imaging device 12 to the first shutter speed for determination in step 42 or 62, which is N/120 second for the NTSC type and N/100 second for the PAL type.

In Eq. 6 or 7, the average value AVE[Fn(y)] contains only the background component αn(y) with the condition that the background components for three or five successive fields, i.e., αn(y), αn_1(y), and αn_2(y), or αn(y), αn_1(y), αn_2(y), αn_3(y), and αn_4(y), be regarded as having the same value. Generally, the amount of motion of an object is small in several successive fields, and the background components for these fields can be regarded as having the same value.

When photographing is conducted by an NTSC imaging apparatus under fluorescent light with fp=60 Hz or under non-fluorescent light, or by a PAL imaging apparatus under fluorescent light with fp=50 Hz or under non-fluorescent light, flicker does not occur if the shutter speed of the NTSC imaging apparatus is set to N/120 second in step 42 or if the shutter speed of the PAL imaging apparatus is set to N/100 second in step 62. Thus, only the background component αn(y) can be extracted as an average value AVE[Fn(y)].

The average value AVE[Fn(y)] is written in an average value storage area 32b of the memory 32 for later processing. The average value storage area 32b preferably stores average values for several previous fields.

The flicker detecting process in step 43 or 63 further includes normalization. In the normalization, the switch 36 is changed to the side shown in FIG. 9 by a switch control signal from the system controller 21, and the normalizing block 34 normalizes the line integration value Fn(y) output from the line integrating block 31 using the average value AVE[Fn(y)] output from the average value determining block 33 to determine a normalized integration value gn(y) given by the following equation:

$$gn(y) = Fn(y) / AVE[Fn(y)] \quad \text{Eq. 8}$$

$$= [\alpha n(y) + \alpha n(y) * \Gamma n(y)] / \alpha n(y)$$

$$= 1 + \Gamma n(y)$$

$$= 1 + \sum_{m=0}^{\infty} \gamma m * \cos(m * \omega o * y + \Phi mn)$$

As shown in FIG. 20, the line integration value Fn(y) given by Eq. 4 is still affected by the signal intensity of the object, and changes in brightness and color due to flicker differ depending upon the area. The line integration value Fn(y) is normalized by the average value AVE[Fn(y)], as given by Eq. 8, thus allowing changes in the brightness and color due to flicker to become uniform in all areas.

Figure 21:
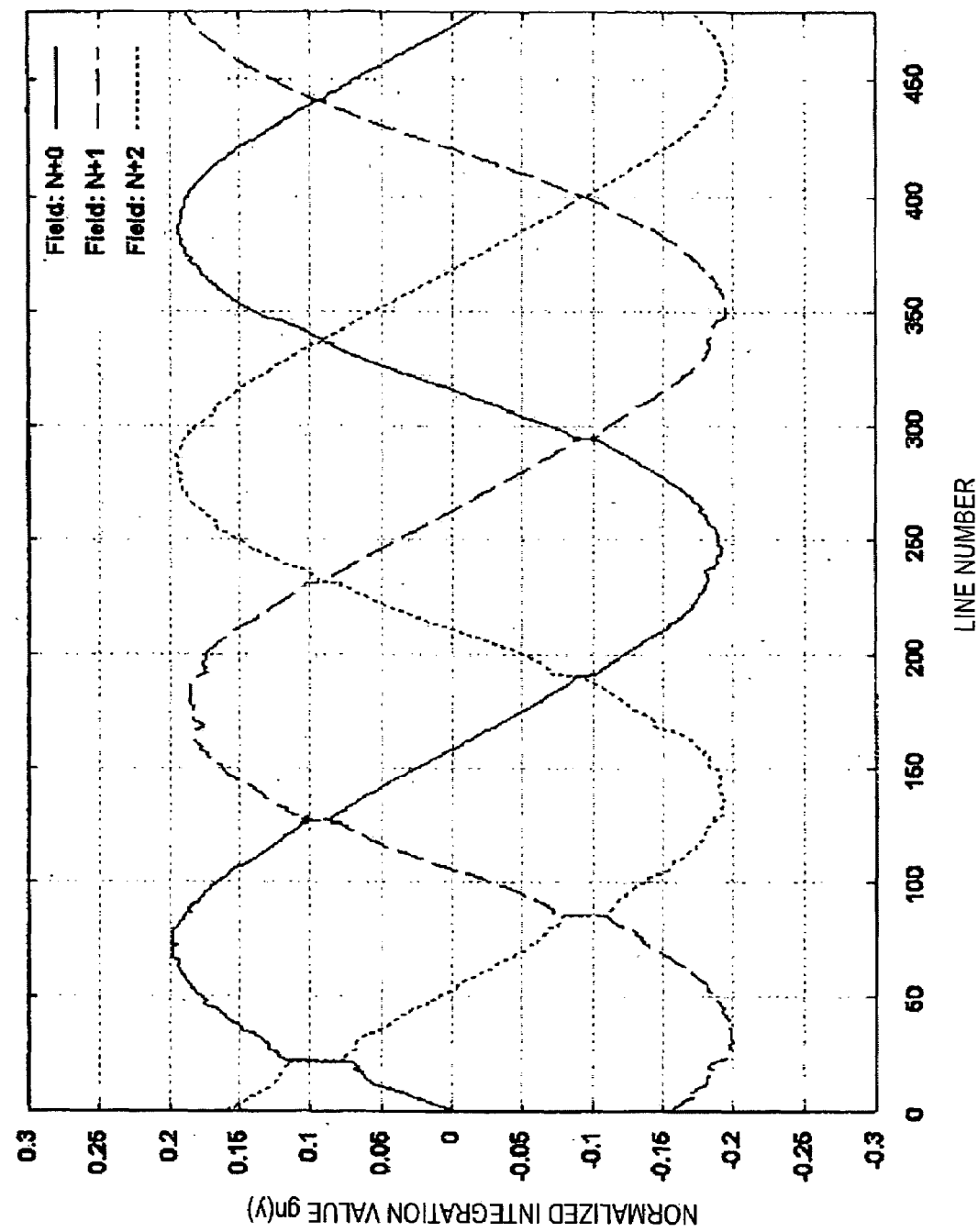
FIG. 21 is a graph showing a normalized integration value obtained when the object shown in FIG. 19 is photographed.

FIG. 21 shows the normalized integration value gn(y) for three successive fields when the object shown in FIG. 19 is photographed by an NTSC CMOS imaging apparatus under fluorescent light with fp=50 Hz. As can be seen from the graph shown in FIG. 21, in the normalized integration value gn(y), the background component is greatly removed compared to the line integration value Fn(y) shown in FIG. 20 that is not normalized.

At this time, the flicker component is detected as the normalized integration value gn(y) in a case where photographing is conducted by an NTSC imaging apparatus under fluorescent light with fp=50 Hz, as shown in the first row of FIG. 7 (see FIGS. 5A and 5C), or by a PAL imaging apparatus under fluorescent light with fp=60 Hz, as shown in the fourth row of FIG. 7 (see FIGS. 6A and 6C).

On the other hand, in the NTSC type, under fluorescent light with fp=60 Hz, or in the PAL type, under fluorescent light with fp=50 Hz, the shutter speed is set in step 42 or 62 to a shutter speed at which flicker does not occur. Thus, the line integration value Fn(y) that is not normalized contains only the background component αn(y). In this case, the normalizing block 34 normalizes the background component using the background component, and the second term in Eq. 8 equals zero even under fluorescent light. Therefore, the normalized integration value αn(y) is always 1 (which exhibits a flat waveform).

The flicker detecting process in step 43 or 63 further includes a DFT operation. The DFT block 35 performs a discrete Fourier transform on the data of the normalized integration value gn(y) from the normalizing block 34, which corresponds to one waveform (L lines) of flicker.

Using the DFT operation DFT[gn(y)] and calling the DFT result at order m Gn(m), the DFT operation DFT[gn(y)] is given by the following equation:

$$DFT[gn(y)] = Gn(m) = \sum_{i=0}^{L-1} gn(i) * W^{m*i} \quad \text{Eq. 9}$$

where $$W = \exp[-j*2\pi/L]$$

The data length of the DFT operation is one wavelength (L lines) of flicker, so that a set of discrete spectra corresponding to an integer multiple of $\omega_0$ can directly be obtained.

In general, an FFT (fast Fourier transform) is used as the Fourier transform in digital signal processing. In this example, the DFT is used because the data length of the Fourier transform is not a power of 2 and the DFT is therefore more suitable than the FFT. However, the FFT may be used after input/output data is processed.

Under fluorescent light, actually, the flicker component can be sufficiently approximated even at a small order m, and all data need not be output by the DFT operation. In the present invention, therefore, the DFT operation is not disadvantageous over the FFT operation in view of operation efficiency.

The DFT block 35 performs the DFT operation given by Eq. 9 to determine the spectrum Gn(m) of the normalized integration value gn(y) given by Eq. 8.

Figure 13:
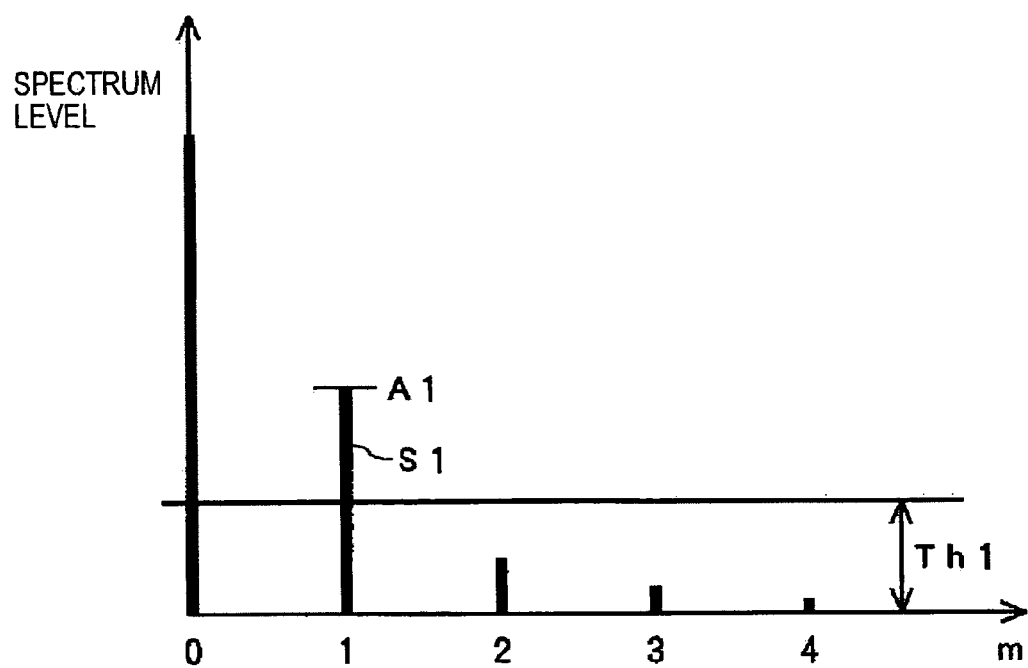
FIG. 13 is a graph showing the spectrum levels under fluorescent light.

Then, a set of spectra shown in FIG. 13 is obtained in a case where photographing is conducted by an NTSC imaging apparatus under fluorescent light with fp=50 Hz, as shown in the first row of FIG. 7, or by a PAL imaging apparatus under fluorescent light with fp=60 Hz, as shown in the fourth row of FIG. 7.

The spectrum levels depend upon the shutter speed, whereas the relationship in amplitude does not change. The spectrum level of the DC component at m=0 is the highest. The higher the order, the lower the spectrum level.

Although the flicker component is constituted by all spectra at the first or higher orders, only the first-order spectrum S1 can be extracted to determine whether or not flicker occurs. Thus, in this example, the DFT operation is performed only for m=1, thereby greatly reducing the number of DFT operations.

In the NTSC type; under fluorescent light with fp=50 Hz, or in the PAL type, under fluorescent light with fp=60 Hz, the level A1 of the first-order spectrum S1 is higher than a threshold value Th1.

Figure 14:
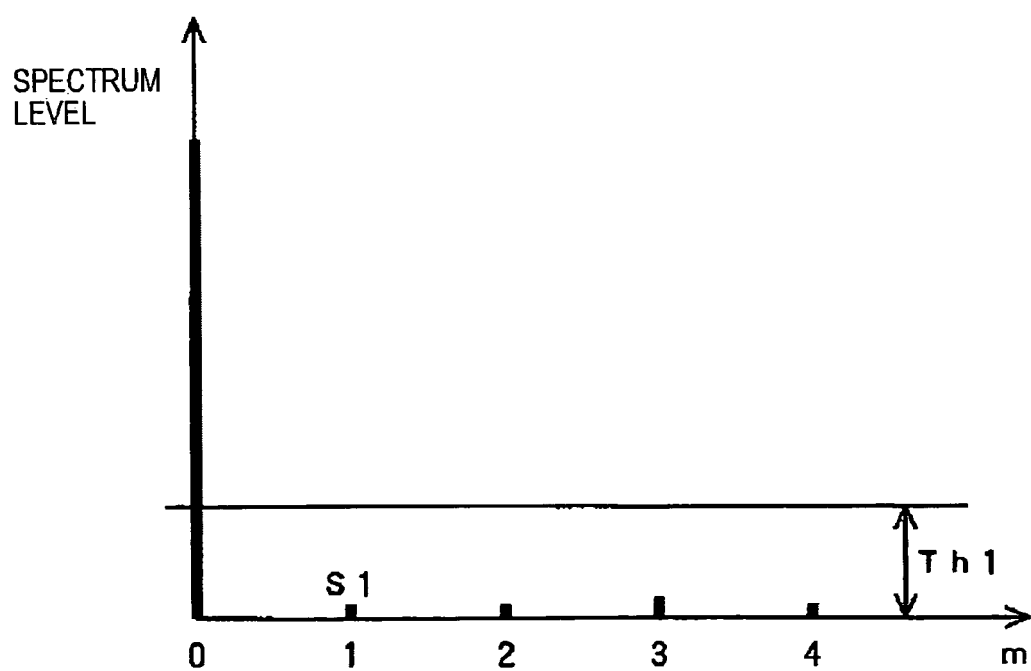
FIG. 14 is a graph showing the spectrum levels under non-fluorescent light.

On the other hand, in the NTSC type, under fluorescent light with fp=60 Hz, shown in the second row of FIG. 7, or under non-fluorescent light, or in the PAL type, under fluorescent light with fp=50 Hz, shown in the third row of FIG. 7, or under non-fluorescent light, the spectra other than the spectrum of the DC component at m=0 become low due to noise, as shown in FIG. 14. The level A1 of the first-order spectrum S1 is below the threshold value Th1.

In the photographic environment determining process routine 40, in the NTSC type, after performing the flicker detecting process described above in step 43, the photographic environment determining unit 22 extracts the first-order spectrum S1 in step 44. In step 45, it is determined whether or not the level A1 of the first-order spectrum S1 is higher than the threshold value Th1.

In the PAL type, after performing the flicker detecting process described above in step 63, the photographic environment determining unit 22 extracts the first-order spectrum S1 in step 64. In step 65, it is determined whether or not the level A1 of the first-order spectrum S1 is higher than the threshold value Th1.

As described above, in the NTSC type, the level A1 of the first-order spectrum S1 higher than the threshold value Th1 means that photographing is conducted under fluorescent light with fp=50 Hz, whereas, in the PAL type, the level A1 of the first-order spectrum S1 higher than the threshold value Th1 means that photographing is conducted under fluorescent light with fp=60 Hz.

Thus, in the NTSC type, if A1>Th1 in step 45, the photographic environment determining unit 22 determines that photographing is conducted under fluorescent light with fp=50 Hz. In step 51, the shutter speed at the actual photographing time is set to N/100 second (specifically, 1/100 second), which is a shutter speed where flicker does not occur, as shown in the first row of FIG. 7.

In the PAL type, if A1>Th1 in step 65, the photographic environment determining unit 22 determines that photographing is conducted under fluorescent light with fp=60 Hz. In step 71, the shutter speed at the actual photographing time is set to N/120 second (specifically, 1/120 second or 1/60 second), which is a shutter speed where flicker does not occur, as shown in the fourth row of FIG. 7.

In either the NTSC or PAL type, the shutter speed at the actual photographing time is set by the AE controller unit 23 based on a determination result of the photographic environment determining unit 22. Underexposure caused by a high shutter speed such as 1/100 second or 1/120 second (that is, a short exposure time) is compensated by iris adjustment or AGC.

As described above, in the NTSC type, it cannot be determined whether photographing is conducted under fluorescent light with fp=60 Hz or under non-fluorescent light when the level A1 of the first-order spectrum S1 is not higher than the threshold value Th1. In the PAL type, it cannot be determined whether photographing is conducted under fluorescent light with fp=50 Hz or under non-fluorescent light when the level A1 of the first-order spectrum S1 is not higher than the threshold value Th1.

Therefore, in the photographic environment determining process routine 40, in the NTSC type, if the photographic environment determining unit 22 determines in step 45 that A1≦Th1, then in step 46, the electronic shutter speed of the CMOS imaging device 12 is set to a second shutter speed for determination, which is N/100 second (specifically, 1/100 second) where one-field flicker occurs under fluorescent light with fp=60 Hz, as shown in the second row of FIG. 7. Then, the routine proceeds to step 47.

In the PAL type, if the photographic environment determining unit 22 determines in step 65 that A1≦Th1, then in step 66, the electronic shutter speed of the CMOS imaging device 12 is set to a second shutter speed for determination, which is N/120 second (specifically, 1/120 second or 1/60 second) where one-field flicker occurs under fluorescent light with fp=50 Hz, as shown in the third row of FIG. 7. Then, the routine proceeds to step 67.

In step 47 or 67, the object is photographed at the second shutter speed set in step 46 or 66, and the flicker detecting unit 19 performs a similar flicker detecting process to that in step 43 or 63, including integrating the input signal In'(x, y), normalizing the line integration value Fn(y), and performing a DFT operation on the normalized integration value gn(y).

In this case, the switch 36 of the flicker detecting unit 19 is changed to the read side opposite to the side shown in FIG. 9. The average value obtained by the flicker detecting process in step 43 or 63, which is read from the average value storage area 32b of the memory 32 by the memory controller 37, is used as the average value AVE[Fn(y)] for normalizing the line integration value Fn(y). Although the average value storage area 32b stores average values for several fields, preferably, the average value for the field as close to the current field as possible is used in order to minimize the influence of motions of the object.

In step 47 or 67, the average value obtained in the flicker detecting process in step 43 or 63 is used to perform the flicker detecting process. Therefore, flicker can be detected as the normalized integration value gn(y) even in a case where flicker is not detectable as the normalized integration value gn(y) at the first shutter speed in the flicker detecting process in step 43 or 63 (that is, in a case where the normalized integration value gn(y) is 1). That is, in the NTSC type, when one-field flicker occurs under fluorescent light with fp=60 Hz, shown in the second row of FIG. 7 (see FIGS. 5B and 5D), or in the PAL type, when one-field flicker occurs under fluorescent light with fp=50 Hz, shown in the third row of FIG. 7 (see FIGS. 6B and 6D), flicker can be detected.

Figure 15:
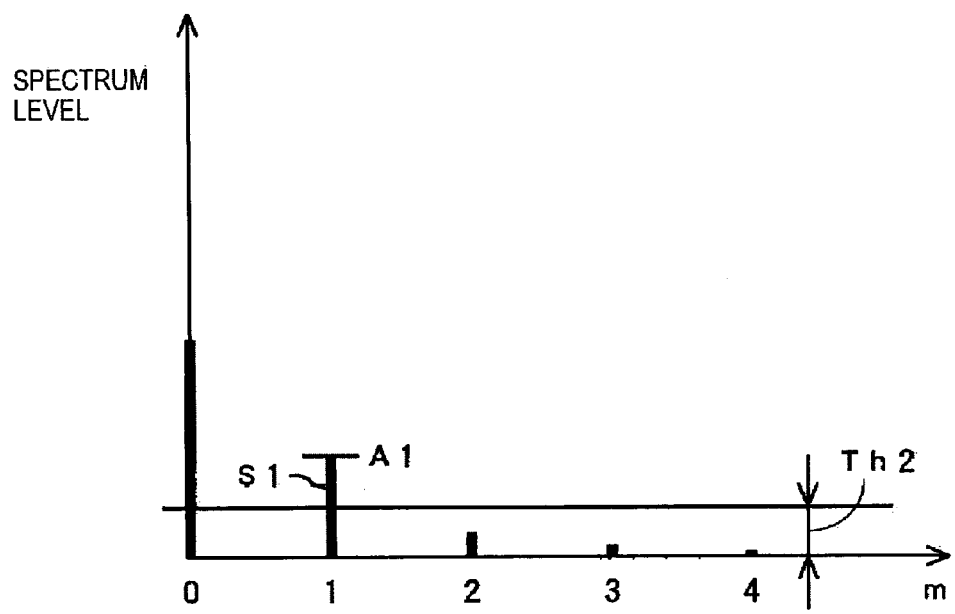
FIG. 15 is a graph showing the spectrum levels under fluorescent light.

FIG. 15 shows a set of spectra obtained when photographing is conducted by an NTSC imaging apparatus under fluorescent light with fp=60 Hz or by a PAL imaging apparatus under fluorescent light with fp=50 Hz. As shown in FIG. 15, the level A1 of the first-order spectrum S1 is higher than a threshold value Th2.

Figure 16:
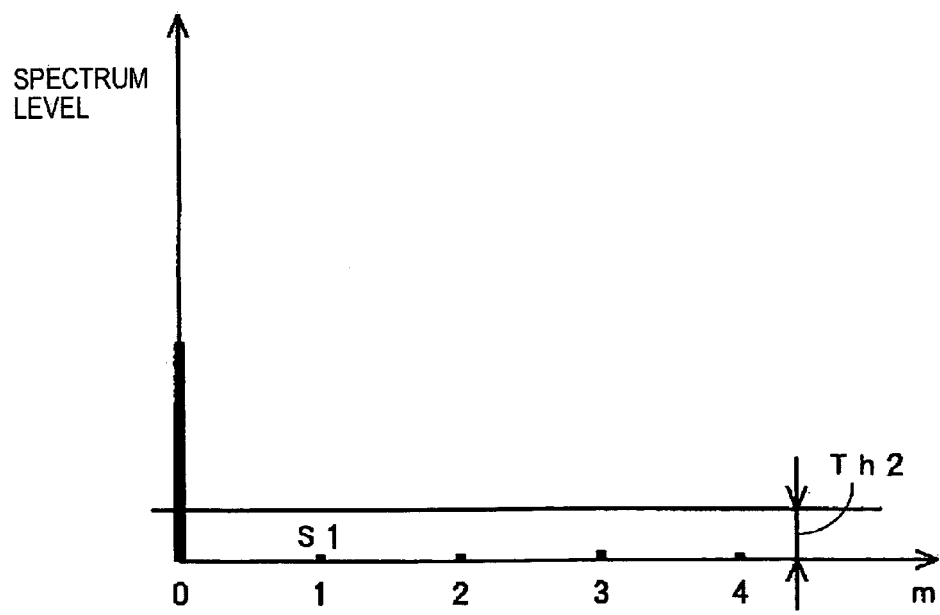
FIG. 16 is a graph showing the spectrum levels under non-fluorescent light.

FIG. 16 shows a set of spectra obtained when photographing is conducted by an NTSC imaging apparatus not under fluorescent light with fp=60 Hz or by a PAL imaging apparatus not under fluorescent light with fp=50 Hz, that is, under non-fluorescent light for either case. As shown in FIG. 16, the spectra other than the spectrum of the DC component at m=0 become low due to noise. The level A1 of the first-order spectrum S1 is below the threshold value Th2.

In the flicker detecting process in step 47 or 67, the average value AVE[Fn(y)] determined at the first shutter speed is used for normalization. In this case, the level of the background component αn(y) is different from that determined at the second shutter speed. This influence is exhibited as the spectrum level, and, as shown in FIG. 15, this spectrum level is different from the spectrum level of the actual flicker component.

However, this influence is small enough to determine whether or not photographing is conducted under fluorescent light. The level A1 of the first-order spectrum S1 clearly differs depending upon whether or not photographing is conducted under fluorescent light.

As shown in FIGS. 13 to 16, the threshold value Th2 is set to a value different from the threshold value Th1 or the threshold values Th1 and Th2 are set low, if necessary. This ensures that it is determined whether or not photographing is conducted by either type of imaging apparatus under fluorescent light with a particular driving power supply frequency.

In the photographic environment determining process routine 40, in the NTSC type, after performing the flicker detecting process described above in step 47, the photographic environment determining unit 22 extracts the first-order spectrum S1 in step 48. In step 49, it is determined whether or not the level A1 of the first-order spectrum S1 is higher than the threshold value Th2.

In the PAL type, after performing the flicker detecting process described above in step 67, the photographic environment determining unit 22 extracts the first-order spectrum S1 in step 68. In step 69, it is determined whether or not the level A1 of the first-order spectrum S1 is higher than the threshold value Th2.

As described above, in the NTSC type, the level A1 of the first-order spectrum S1 higher than the threshold value Th2 means that photographing is conducted under fluorescent light with fp=60 Hz, whereas, in the PAL type, the level A1 of the first-order spectrum S1 higher than the threshold value Th2 means that photographing is conducted under fluorescent light with fp=50 Hz.

Thus, in the NTSC type, if A1>Th2 in step 49, the photographic environment determining unit 22 determines that photographing is conducted under fluorescent light with fp=60 Hz. In step 52, the shutter speed at the actual photographing time is set to N/120 second (specifically, 1/120 second or 1/60 second), which is a shutter speed where flicker does not occur, as shown in the second row of FIG. 7.

In the PAL type, if A1>Th2 in step 69, the photographic environment determining unit 22 determines that photographing is conducted under fluorescent light with fp=50 Hz. In step 72, the shutter speed at the actual photographing time is set to N/100 second (specifically, 1/100 second or 1/50 second), which is a shutter speed where flicker does not occur, as shown in the third row of FIG. 7.

In either the NTSC or PAL type, the shutter speed at the actual photographing time is set by the AE control unit 23 based on a determination result of the photographic environment determining unit 22. Underexposure caused by a high shutter speed such as 1/120 second or 1/100 second (that is, a short exposure time) is compensated by iris adjustment or AGC.

In the NTSC type, if A1≦Th2 in step 49, the photographic environment determining unit 22 determines that photographing is conducted under non-fluorescent light (that is, not under fluorescent light with fp=50 Hz or fp=60 Hz). In step 53, normal shutter control is performed as shutter control at the actual photographing time. In the PAL type, if A1≦Th2 in step 69, the photographic environment determining unit 22 also determines that photographing is conducted under non-fluorescent light. In step 73, normal shutter control is performed as shutter control at the actual photographing time.

In this case, the shutter speed at the actual photographing time is also set by the AE control unit 23 based on a determination result of the photographic environment determining unit 22. The shutter speed can be set to any value within one field (i.e., 1/60 second for the NTSC type and 1/50 second for the PAL type) because flicker does not occur under non-fluorescent light.

In the example described above, in order to determine a photographic environment, in the NTSC type, the shutter speed is set to N/120 second in step 42 and to N/100 second in step 46, and in the PAL type, the shutter speed is set to N/100 second in step 62 and to N/120 second in step 66. Alternatively, in the NTSC type, the shutter speed may be set to a value other than N/100 second in step 42 and to a value other than N/120 second in step 46, which is different from the value set in step 42. In the PAL type, the shutter speed may be set to a value other than N/120 second in step 62 and to a value other than N/100 second in step 66, which is different from the value set-in step 62.

In the NTSC type, if the shutter speed is set to a value other than N/100 second in step 42, as shown in the first row of FIG. 7, continuous flicker on the time axis with intervals of three fields occurs under fluorescent light with fp=50 Hz. As in the example described above, only the background component αn(y) in which the flicker component is cancelled is extracted as the average value AVE[Fn(y)] given in Eq. 6 in the flicker detecting process in step 43, and it can therefore be determined that photographing is conducted under fluorescent light with fp=50 Hz.

Under fluorescent light with fp=60 Hz, on the other hand, if the shutter speed is set to a value other than N/100 second in step 42, as shown in the second row of FIG. 7, one-field flicker occurs. Unlike the example described above, in the flicker detecting process in step 43, only the background component αn(y) cannot be extracted as the average value AVE[Fn(y)], and the line integration value Fn(y) is obtained as it is.

In this case, if the shutter speed is set to a value other than N/120 second in step 46, in the flicker detecting process in step 47, the average value obtained by the flicker detecting process in step 43, which is read from the memory 32, that is, the line integration value Fn(y) itself, is used as the average value AVE[Fn(y)] for normalizing the line integration value Fn(y).

Figure 17A:
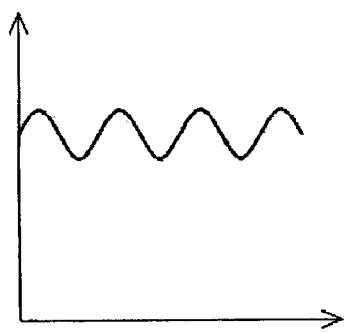
FIGS. 17A to 17C are graphs showing integration of an integration value.
Figure 17B:
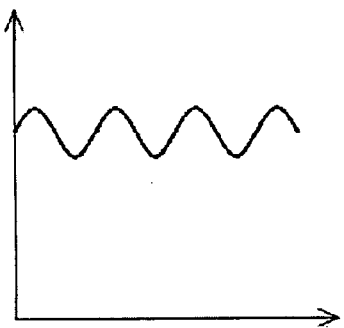
Figure 17C:
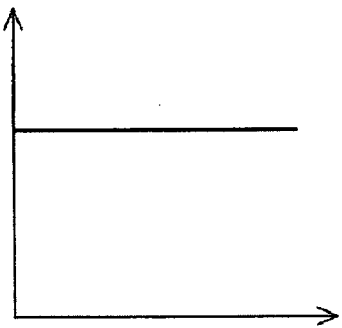

Referring to FIGS. 17A to 17C, the current integration value Fn(y) shown in FIG. 17A is normalized by the integration value Fn(y) read from the memory 32, shown in FIG. 17B, and a flat signal waveform appears as the normalized integration value gn(y), as shown in FIG. 17C, regardless of under fluorescent light with fp=60 Hz.

Figure 18A:
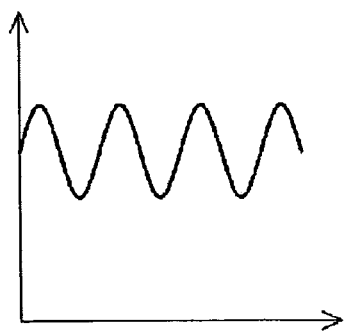
FIGS. 18A to 18C are graphs showing integration of an integration value.
Figure 18B:
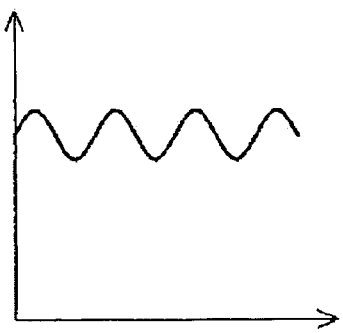
Figure 18C:
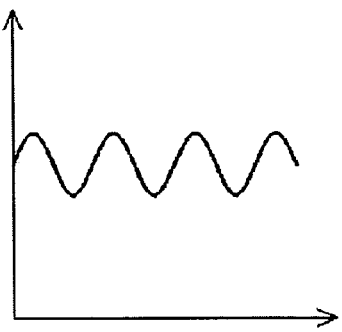

However, actually, if the shutter speed is set to a value other than N/120 second in step 46, which is different from the value (i.e., the shutter speed other than N/100 second) set in step 42. In the flicker detecting process in step 47, therefore, as shown in FIGS. 18A to 18C, the current integration value Fn(y) shown in FIG. 18A is different in amplitude from the integration value Fn(y) read from the memory 32 as the average value AVE[Fn(y)], shown in FIG. 18B, and the normalized integration value gn(y) shown in FIG. 18C does not exhibit a flat signal waveform.

As in the example described above, under fluorescent light with fp=60 Hz, the spectrum of the flicker component can be extracted, and it can therefore be determined in step 49 that photographing is conducted under fluorescent light with fp=60 Hz.

In this case, the DC level and amplitude of the normalized integration value gn(y) are different from those of the value normalized by the background component αn(y). However, this difference is negligible to determine whether or not photographing is conducted under fluorescent light.

In the PAL type, if the shutter speed is set to a value other than N/120 second in step 62, as shown in the fourth row of FIG. 7, continuous flicker on the time axis with intervals of five fields occurs under fluorescent light with fp=60 Hz. In the flicker detecting process in step 63, as in the example described above, only the background component αn(y) in which the flicker component is cancelled is extracted as the average value AVE[Fn(y)] given by Eq. 7, and it can therefore be determined that photographing is conducted under fluorescent light with fp=60 Hz.

Under fluorescent light with fp=50 Hz, on the other hand, if the shutter speed is set to a value other than N/120 second in step 62, as shown in the third row of FIG. 7, one-field flicker occurs. Unlike the example described above, in the flicker detecting process in step 63, only the background component αn(y) cannot be extracted as the average value AVE[Fn(y)], and the line integration value Fn(y) is obtained as it is.

In this case, if the shutter speed is set to a value other than N/100 second in step 66, which is different from the value (i.e., the shutter speed other than N/120 second) set in step 62, as in the NTSC type, a signal having a certain amplitude is obtained as the normalized integration value gn(y) in the flicker detecting process in step 67, and the spectrum of the flicker component is extracted. In step 69, therefore, it can be determined that photographing is conducted under fluorescent light with fp=50 Hz.

In the example described above, the shutter speed at the actual photographing time is set in step 51 or 71 to a value where flicker does not occur. In step 51 or 71, the shutter speed at the actual photographing time may be set to a value where continuous flicker on the time axis with intervals of three fields or five fields, shown in FIGS. 5A and 5C or FIGS. 6A and 6C. In this case, however, the imaging apparatus is configured so that a flicker reducing process is performed by the digital signal processor 14.

More specifically, in the NTSC type, if it is determined that photographing is conducted under fluorescent light with fp=50 Hz, in step 51, the shutter speed may be set to, for example, a normal shutter speed or 1/60 second. In the PAL type, if it is determined that photographing is conducted under fluorescent light with fp=60 Hz, in step 71, the shutter speed may be set to, for example, a normal shutter speed or 1/50 second.

In this case, the continuous flicker shown in FIGS. 5A and 5C or FIGS. 6A and 6C is utilized to estimate the flicker component in the video signal of the photographic output, and the video signal of the photographic output is corrected according to the estimation. For example, the gain of the video signal is adjusted according to the estimated flicker component, or the estimated flicker component is subtracted from the video signal. In this way, the amount of flicker component is reduced in the video signal of the photographic output. The flicker component may be estimated using the flicker detecting unit 19.

The photographic environment determining method for an imaging apparatus that is initially fixed to either the NTSC or PAL format will now be described.

In case of an imaging apparatus whose video format is initially fixed to the NTSC format, the video format determination step 41 is omitted. The photographic environment determination process in steps 42 to 49 is performed, and the shutter control at the actual photographing time is performed in step 51, 52, or 53.

In case of an imaging apparatus whose video format is initially fixed to the PAL format, the video format determination step 41 is omitted. The photographic environment determination process in steps 62 to 69 is performed, and the shutter control at the actual photographing time is performed in step 71, 72, or 73.

The photographic environment determining method for a progressive imaging apparatus having a frame frequency of 30 Hz will now be described.

In this case, under fluorescent light with fp=50 Hz, three frames (i.e., ⅒ second) is an integer multiple (10 times) of the fluorescent-light illumination period (i.e., ¹⁄₁₀₀ second), and flicker occurs in the manner shown in the fifth row of FIG. 7. Under fluorescent light with fp=60 Hz, one frame (i.e., ¹⁄₃₀ second) is an integer multiple (four times) of the fluorescent-light illumination period (i.e., ¹⁄₁₂₀ second), and flicker occurs in the manner shown in the sixth row of FIG. 7.

In the progressive imaging apparatus having a frame frequency of 30 Hz, therefore, the flicker detecting unit 19 and the photographic environment determining process routine are configured in a similar manner to those of the NTSC imaging apparatus described above, except for "frame" instead of "field" and fv=30 Hz.

More specifically, in the photographic environment determining process routine, the video format determination step 41 is omitted. In step 42, the first shutter speed for determination is set to a value other than N/100 second, such as N/120 second (specifically, ¹⁄₁₂₀ second, ¹⁄₆₀ second, ¹⁄₄₀ second, or ¹⁄₃₀ second). In step 43, the flicker detecting process described above is performed. In step 44, the first-order spectrum S1 is extracted. In step 45, it is determined whether or not the level A1 of the first-order spectrum S1 is higher than the threshold value Th1.

If it is determined in step 45 that A1>Th1, it is determined that photographing is conducted under fluorescent light with fp=50 Hz. In step 51, the shutter speed at the actual photographing time is set to N/100 second (specifically, ¹⁄₁₀₀ second, ¹⁄₅₀ second, or ³⁄₁₀₀ second), which is a shutter speed where flicker does not occur, as shown in the fifth row of FIG. 7.

The shutter speed at the actual photographing time may be set to a normal shutter speed or ¹⁄₃₀ second. In this case, as shown in the fifth row of FIG. 7, continuous flicker on the time axis with intervals of three frames occurs. Thus, the flicker reducing process described above is performed to reduce the amount of flicker.

If it is determined in step 45 that A1≦Th1, in step 46, the second shutter speed for determination is set to a value other than N/120 second, such as N/100 second (specifically, ¹⁄₁₀₀ second, ¹⁄₅₀ second, or ³⁄₁₀₀ second), which is different from the value set in step 42. In step 47, the flicker detecting process described above is performed. In step 48, the first-order spectrum S1 is extracted. In step 49, it is determined whether or not the level A1 of the first-order spectrum S1 is higher than the threshold value Th2.

If it is determined in step 49 that A1>Th2, it is determined that photographing is conducted under fluorescent light with fp=60 Hz. In step 52, the shutter speed at the actual photographing time is set to N/120 second (specifically, ¹⁄₁₂₀ second, ¹⁄₆₀ second, ¹⁄₄₀ second, or ¹⁄₃₀ second), which is a shutter speed where flicker does not occur, as shown in the sixth row of FIG. 7.

If it is determined in step 49 that A1≦Th2, it is determined that photographing is conducted under non-fluorescent light. In step 53, normal shutter control is performed as shutter control at the actual photographing time.

Other Embodiments

For example, in case of a progressive imaging apparatus having a frame frequency of 25 Hz, the processing similar to that for a PAL imaging apparatus with fv=50 Hz may be performed. In case of a progressive imaging apparatus having a frame frequency of 40 Hz, the processing similar to that for an NTSC imaging apparatus with fv=60 Hz may be performed.

While a CMOS imaging apparatus has been described, the present invention is also applicable to an XY-address-scanning imaging apparatus other than a CMOS imaging apparatus.

In the foregoing embodiment, it is determined whether or not photographing is conducted under fluorescent light with fp=50 Hz and whether or not photographing is conducted under fluorescent light with fp=60 Hz. According to a determination result, the shutter speed is set to a value where flicker does not occur in the video signal of the photographic output, or the amount of flicker caused in the video signal is reduced. However, the photographic environment determining method according to the present invention may also be applied to optimization of WB adjustment control or AE adjustment control under fluorescent light and non-fluorescent light.

In the foregoing embodiment, the digital signal processor 14 including the flicker detecting unit 19 is configured by hardware. However, a portion of or the entirety of the flicker detecting unit 19 or the digital signal processor 14 may be configured by software.

What is claimed is:

1. A method for determining a photographic environment when an object is photographed by an imaging apparatus including an XY-address-scanning imaging device, the method comprising:

a first step of setting a shutter speed of the imaging device to a first shutter speed according to a vertical sync frequency of the imaging device;

a second step of integrating a video signal obtained from the imaging device at the first shutter speed within a screen area to determine an integration value, and normalizing the determined integration value by an average value of a plurality of integration values to determine a first normalized integration value, the plurality of integration values being obtained in a plurality of successive vertical sync periods;

a third step of extracting a first frequency component from the first normalized integration value, and determining whether the first frequency component has a higher level than a first threshold value, the first frequency component being a first-order spectrum of the first normalized integration value;

a fourth step of setting the shutter speed of the imaging device to a second shutter speed different from the first shutter speed under a condition that the level of the first frequency component is equal to or lower than the first threshold value, independent of any other condition;

a fifth step of integrating a video signal obtained from the imaging device at the second shutter speed within a screen area to determine an integration value, and normalizing the determined integration value by the average value used in the second step to determine a second normalized integration value; and a sixth step of extracting a second frequency component from the second normalized integration value to determine whether the second frequency component has a higher level than a second threshold value, the second frequency component being a first-order spectrum of the second normalized integration value.

2. The method according to claim 1, further comprising the step of determining the vertical sync frequency of the imaging device.

3. The method according to claim 1, wherein the vertical sync frequency of the imaging device is 120/J Hz, where J is a positive integer, in the first step, the first shutter speed is set to a value other than N/100 second, where N is a positive integer, and in the fourth step, the second shutter speed is set to a value other than N/120 second, which is different from the value of the first shutter speed.

4. The method according to claim 3, wherein the first shutter speed is set to N/120 second.

5. The method according to claim 3, wherein the second shutter speed is set to N/100 second.

6. The method according to claim 3, wherein when the level of the first frequency component is higher than the first threshold value, the shutter speed of the imaging device is set to N/100 second.

7. The method according to claim 3, wherein when the level of the second frequency component is higher than the second threshold value, the shutter speed of the imaging device is set to N/120 second.

8. The method according to claim 1, wherein the vertical sync frequency of the imaging device is 100/J Hz, where J is a positive integer, in the first step, the first shutter speed is set to a value other than N/120 second, where N is a positive integer, and in the fourth step, the second shutter speed is set to a value other than N/100, which is different from the value of the first shutter speed.

9. The method according to claim 8, wherein the first shutter speed is set to N/100 second.

10. The method according to claim 8, wherein the second shutter speed is set to N/120 second.

11. The method according to claim 8, wherein when the level of the first frequency component is higher than the first threshold value, the shutter speed of the imaging device is set to N/120 second.

12. The method according to claim 1, wherein when the level of the second frequency component is higher than the second threshold value, the shutter speed of the imaging device is set to N/100 second.

13. The method according to claim 1, wherein the first threshold value and the second threshold value are different.

14. An imaging apparatus including an XY-address-scanning imaging device, the imaging apparatus comprising:

a control unit that sets a shutter speed of the imaging device;

an integrating unit that integrates a video signal obtained by the imaging device within a screen area to determine an integration value;

an average determining unit that determines an average value of a plurality of integration values obtained in a plurality of successive vertical sync periods;

a normalizing unit that normalizes the integration value by the average value determined by the average determining unit to determine a normalized integration value; and an extracting unit that extracts a particular frequency component from the normalized integration value, the particular frequency component being a first-order spectrum of the normalized integration value, wherein the control unit sets the shutter speed of the imaging device to a first shutter speed according to a vertical sync frequency of the imaging device, the control unit determines whether a first frequency component extracted based on a video signal obtained at the first shutter speed has a higher level than a first threshold value, under a condition that the level of the first frequency component is equal to or lower than the first threshold value, the control unit sets the shutter speed of the imaging device to a second shutter speed different from the first shutter speed, independent of any other condition; and the control unit determines whether a second frequency component extracted based on a video signal obtained at the second shutter speed has a higher level than a second threshold value, the second frequency component being a first-order spectrum of the second normalized integration value.

15. The apparatus according to claim 14, wherein the vertical sync frequency of the imaging device is 120/J Hz, where J is a positive integer, and the control unit sets the first shutter speed to a value other than N/100 second, and sets the second shutter speed to a value other than N/120 second, the value of the second shutter speed being different from the value of the first shutter speed, where N is a positive integer.

16. The apparatus according to claim 15, wherein the control unit sets the first shutter speed to N/120 second.

17. The apparatus according to claim 15, wherein the control unit sets the second shutter speed to N/100 second.

18. The apparatus according to claim 15, wherein, when the level of the first frequency component is higher than the first threshold value, the control unit sets the shutter speed of the imaging device to N/100 second.

19. The apparatus according to claim 15, wherein when the level of the second frequency component is higher than the second threshold value, the control unit sets the shutter speed of the imaging device to N/120 second.

20. The apparatus according to claim 14, wherein the vertical sync frequency of the imaging device is 100/J Hz, where J is a positive integer, and the control unit sets the first shutter speed to a value other than N/120 second, and sets the second shutter speed to a value other than N/100 second, the value of the second shutter speed being different from the value of the first shutter speed, where N is a positive integer.

21. The apparatus according to claim 20, wherein the control unit sets the first shutter speed to N/100 second.

22. The apparatus according to claim 20, wherein the control unit sets the second shutter speed to N/120 second.

23. The apparatus according to claim 20, wherein when the level of the first frequency component is higher than the first threshold value, the control unit sets the shutter speed of the imaging device to N/120 second.

24. The apparatus according to claim 20, wherein when the level of the second frequency component is higher than the second threshold value, the control unit sets the shutter speed of the imaging device to N/100 second.

25. The apparatus according to claim 14, wherein the first threshold value and the second threshold value are different.

26. The apparatus according to claim 14, further comprising an average value storing unit, wherein the average value storing unit stores the average value determined by the average determining unit based on the video signal obtained at the first shutter speed, and the normalizing unit normalizes the integration value by the average value stored in the average value storing unit to determine a normalized integration value based on the video signal obtained at the second shutter speed.

27. The apparatus according to claim 14, wherein the average determining unit determines an average value of a plurality of integration values obtained in three successive vertical periods.

28. The apparatus according to claim 14, wherein the average determining unit determines an average value of a plurality of integration values obtained in five continuous vertical periods.

* * * * *

UNITED STATES PATENT AND TRADEMARK OFFICE
CERTIFICATE OF CORRECTION

| | |
|---|---|
| PATENT NO. | : 7,639,284 B2 |
| APPLICATION NO. | : 10/935031 |
| DATED | : December 29, 2009 |
| INVENTOR(S) | : Masaya Kinoshita |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Ninth Day of November, 2010

David J. Kappos
*Director of the United States Patent and Trademark Office*